United States Patent
Sampath et al.

(10) Patent No.: US 11,356,943 B2
(45) Date of Patent: Jun. 7, 2022

(54) SMART DIRECTIONAL REPEATER INITIALIZATION

(71) Applicant: QUALCOMM Incorporated, San Diego, CA (US)

(72) Inventors: Ashwin Sampath, Skillman, NJ (US); Junyi Li, Chester, NJ (US); Navid Abedini, Somerset, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/002,591

(22) Filed: Aug. 25, 2020

(65) Prior Publication Data

US 2021/0068050 A1  Mar. 4, 2021

Related U.S. Application Data

(60) Provisional application No. 62/892,322, filed on Aug. 27, 2019.

(51) Int. Cl.
| | |
|---|---|
| *H04W 48/20* | (2009.01) |
| *H04W 48/10* | (2009.01) |
| *H04W 76/10* | (2018.01) |
| *H04B 7/06* | (2006.01) |
| *H04W 84/04* | (2009.01) |

(52) U.S. Cl.
CPC .......... *H04W 48/20* (2013.01); *H04B 7/0628* (2013.01); *H04W 48/10* (2013.01); *H04W 76/10* (2018.02); *H04W 84/045* (2013.01); *H04W 84/047* (2013.01)

(58) Field of Classification Search
CPC ... H04W 84/047; H04W 76/10; H04W 48/20; H04W 84/045
See application file for complete search history.

(56) References Cited

U.S. PATENT DOCUMENTS

| | | | |
|---|---|---|---|
| 2014/0162704 A1* | 6/2014 | Choi | G01S 1/08 455/456.6 |
| 2016/0204847 A1* | 7/2016 | Ryu | H04W 72/048 455/7 |
| 2018/0343653 A1 | 11/2018 | Guo | |
| 2019/0199496 A1 | 6/2019 | Qin et al. | |

OTHER PUBLICATIONS

International Search Report and Written Opinion—PCT/US2020/047977—ISAEPO—Dec. 8, 2020.

* cited by examiner

*Primary Examiner* — Keith Ferguson
(74) *Attorney, Agent, or Firm* — Patterson & Sheridan, LLP

(57) ABSTRACT

Aspects of the present disclosure provide apparatus, methods, processing systems, and computer readable mediums for initiating directional repeaters (wireless devices that relay directional wireless signals) that have an ability to be controlled by a base station (BS), for example, for beamforming purposes.

30 Claims, 13 Drawing Sheets

SMART DIRECTIONAL REPEATER INITIALIZATION

CROSS-REFERENCE TO RELATED APPLICATION

This application claims benefit of and priority to U.S. Provisional Patent Application No. 62/892,322, filed Aug. 27, 2019, which is hereby incorporated by reference in its entirety.

BACKGROUND

Field of the Disclosure

Aspects of the present disclosure relate to wireless communications, and more particularly, to techniques for initializing wireless devices capable of repeating directional wireless transmissions.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more BSs may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or a DU may communicate with a set of UEs on downlink channels (e.g., for transmissions from the BS or the DU to the UE) and uplink channels (e.g., for transmissions from the UE to the BS or the DU).

These multiple access technologies have been adopted in various telecommunication standards to provide a common protocol that enables different wireless devices to communicate on a municipal, national, regional, and even global level. The NR (e.g., new radio or 5G) is an example of an emerging telecommunication standard. The NR is a set of enhancements to the LTE mobile standard promulgated by 3GPP. The NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, the NR supports beamforming, multiple-input multiple-output (MIMO) antenna technology, and carrier aggregation.

However, as the demand for mobile broadband access continues to increase, there exists a need for further improvements in the NR and the LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that may include desirable communication in integrated access and backhaul (IAB) systems.

Certain aspects provide a method for wireless communications by a first wireless device. The method generally includes receiving, from a base station (BS), broadcast information indicating that the BS supports wireless devices that are capable of acting as repeaters. The method further includes performing an initial access procedure with the BS based on the broadcast information whereby the first wireless device provides an indication that the first wireless device is capable of acting as a repeater. The method further includes providing information to the BS regarding beams supported by the first wireless device.

Certain aspects provide a method for wireless communications by a BS. The method generally includes transmitting broadcast information indicating that the BS supports wireless devices that are capable of acting as repeaters. The method further includes performing an initial access procedure with a first wireless device whereby the first wireless device provides an indication that the first wireless device is capable of acting as a repeater. The method further includes receiving information from the first wireless device regarding beams supported by the first wireless device. The method further includes using the information regarding the beams to configure the first wireless device to exchange radio frequency (RF) signals between the BS and at least one second wireless device.

Certain aspects provide an apparatus for wireless communications by a first wireless device. The apparatus may include at least one processor and a memory. The at least one processor and the memory may be configured to receive, from a BS, broadcast information indicating that the BS supports wireless devices that are capable of acting as repeaters. The at least one processor and the memory may further be configured to participate in an initial access procedure with the BS, based on the broadcast information, whereby the first wireless device provides an indication that the first wireless device is capable of acting as a repeater. The at least one processor and the memory may further be configured to provide information to the BS regarding beams supported by the first wireless device.

Certain aspects provide an apparatus for wireless communications by a BS. The apparatus may include at least one processor and a memory. The at least one processor and the memory may be configured to transmit broadcast information indicating that the BS supports wireless devices that are capable of acting as repeaters. The at least one processor and the memory may further be configured to perform an initial access procedure with a first wireless device, whereby the first wireless device provides an indication that the first wireless device is capable of acting as a repeater. The at least one processor and the memory may further be configured to receive information from the first wireless device regarding beams supported by the first wireless device. The at least one processor and the memory may further be configured to use the information regarding the beams to configure the first wireless device to exchange RF signals between the BS and at least one second wireless device.

Aspects of the present disclosure also provide various apparatus, means, and computer readable mediums for (or capable of) performing operations described above.

To the accomplishment of the foregoing and related ends, the one or more aspects including the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
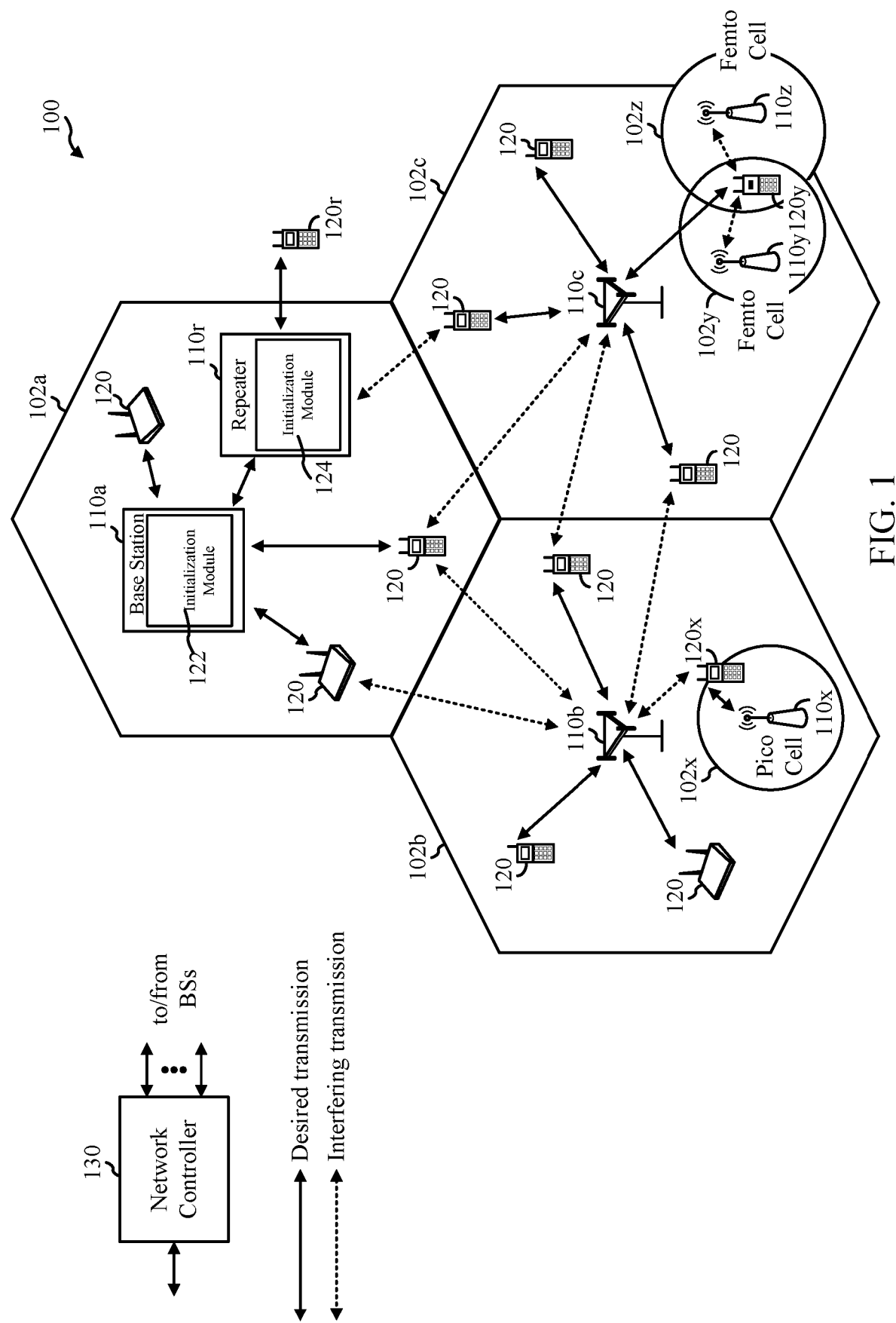
FIG. 1 is a block diagram conceptually illustrating an example wireless system, in accordance with certain aspects of the present disclosure.

Aspects of the present disclosure provide apparatus, methods, processing systems, and computer readable mediums to initialize a directional repeater (for example, a wireless device that may relay directional wireless signals) that is considered enhanced (or "smart") relative to a conventional repeater that is basically limited to receiving, amplifying, and relaying radio frequency (RF) signals. During the initialization process of the repeater, messages (for example, radio resource control (RRC) messages) may be exchanged between a base station (BS) and the repeater. These messages may at least include a codebook map, which may be transmitted by the repeater to the BS. The codebook map may include technical information associated with functional capability of the repeater. The BS may use the technical information to instruct the repeater on where to steer the RF signals during an operational mode of the repeater.

The following description provides examples of initializing the wireless devices, such as the directional repeaters capable of repeating directional wireless transmissions, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as long-term evolution (LTE), code division multiple access (CDMA), time division multiple access (TDMA), frequency division multiple access (FDMA), orthogonal frequency-division multiple access (OFDMA), single-carrier FDMA (SC-FDMA) and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as New Radio (NR) (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

NR is an emerging wireless communications technology under development in conjunction with the 5G Technology Forum (5GTF). 3rd Generation Partnership Project (3GPP) LTE and LTE-Advanced (LTE-A) are releases of UMTS that use E-UTRA. UTRA, E-UTRA, UMTS, LTE, LTE-A and GSM are described in documents from an organization named 3GPP. CDMA2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

NR access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These wireless communication services may include latency and reliability requirements. These wireless communication services may also have different transmission time intervals (TTI) to meet respective quality of service (QoS) requirements. In addition, these wireless communication services may co-exist in the same subframe.

The teachings herein may be incorporated into (e.g., implemented within or performed by) a variety of wired or wireless apparatuses (e.g., nodes). In some aspects, a wireless node implemented in accordance with the teachings herein may comprise an access point (AP) or an access terminal (AT).

The AP may comprise, be implemented as, or known as a node B (NB), a radio network controller (RNC), an evolved node B (eNB), a base station controller (BSC), a base transceiver station (BTS), a base station (BS), a transceiver function (TF), a radio router, a radio transceiver, a basic service set (BSS), an extended service set (ESS), a radio base station ("RBS"), an integrated access and backhauling (IAB) node (e.g., an IAB donor node, an IAB parent node, and an IAB child node), or some other terminology.

The AT may comprise, be implemented as, or known as a subscriber station, a subscriber unit, a mobile station, a remote station, a remote terminal, a user terminal, a user agent, a user device, a user equipment (UE), a user station, or some other terminology. In some implementations, the AT may comprise a cellular telephone, a cordless telephone, a session initiation protocol (SIP) phone, a wireless local loop (WLL) station, a personal digital assistant (PDA), a handheld device having wireless connection capability, a station (STA), or some other suitable processing device connected to a wireless modem (such as an augmented reality (AR)/virtual reality (VR) console and headset). Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network, such as the Internet or a cellular network) via a wired or wireless communication link.

Example Wireless Communications System

FIG. 1 illustrates an example wireless communication network 100 in which aspects of the present disclosure may be performed. For example, as shown in FIG. 1, a BS 110a may include an initialization module 122 (for example, a repeater initialization module), which may be designed and configured to initialize a repeater 110r and to intelligently relay analog RF signals (e.g., by allowing for optimal beam selection) rather than simply retransmit the received analog RF signals to another wireless device. The RF signals may include downlink (DL) RF signals from the BS 110a to another wireless device (e.g., a user equipment or another repeater), as well as uplink (UL) RF signals from another wireless device to the BS 110a. The repeater 110r may include an initialization module 124. The initialization module 124 may be configured to receive configuration information from the BS 110a. The initialization module 124 may process the configuration information and initialize the repeater 110r to intelligently relay the analog RF signals. In some cases, the repeater 110r and the BS 110a may be configured to perform operations 1000 and 1100 of FIGS. 10 and 11, respectively.

The wireless communication network 100 may, for example, be a NR or 5G network. As illustrated in FIG. 1, the wireless communication network 100 may include a number of BSs (or APs) 110a-z (each also individually referred to herein as AP 110 or collectively as APs 110) and other network entities. An AP 110 may be a station that communicates with UEs 120a-y (each also individually referred to herein as UE 120 or collectively as UEs 120). Each AP 110 may provide communication coverage for a particular geographic area. In 3GPP, the term "cell" can refer to a coverage area of a NB and/or a NB subsystem serving this coverage area, depending on the context in which the term is used. In NR systems, the term "cell" and next generation NB (for example, gNB or gNodeB), NR AP, 5G NB, or transmission reception point (TRP) may be interchangeable. In some examples, the cell may not necessarily be stationary, and the geographic area of the cell may move according to a location of a mobile AP 110. In some examples, the APs 110 may be interconnected to one another and/or to one or more other APs 110 or network nodes (not shown) in the wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. The RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, the NR or 5G RAT networks may be deployed.

The AP 110 may provide communication coverage for a macro cell, a pico cell, a femto cell, and/or other types of cells. The macro cell may cover a relatively large geographic area (e.g., several kilometers in radius) and may allow unrestricted access by the UEs 120 with service subscription. The pico cell may cover a relatively small geographic area and may allow unrestricted access by the UEs 120 with service subscription. The femto cell may cover a relatively small geographic area (e.g., a home) and may allow restricted access by UEs having an association with the femto cell (e.g., UEs 120 in a Closed Subscriber Group (CSG), the UEs 120 for users in the home, etc.). The AP 110 for the macro cell may be referred to as a macro AP. The AP 110 for the pico cell may be referred to as a pico AP. The AP 110 for the femto cell may be referred to as a femto AP or a home AP. In the example shown in FIG. 1, the APs 110a, 110b and 110c may be macro APs for the macro cells 102a, 102b and 102c, respectively. The AP 110x may be a pico AP for a pico cell 102x. The APs 110y and 110z may be femto APs for the femto cells 102y and 102z, respectively. The AP 110 may support one or multiple (e.g., three) cells.

The wireless communication network 100 may also include relay stations. A relay station is a station that receives a transmission of data and/or other information from an upstream station (e.g., the AP 110 or the UE 120) and sends a transmission of the data and/or other information to a downstream station (e.g., the UE 120 or the AP 110). The relay station may also be the UE 120 that relays transmissions for other UEs 120. In the example shown in FIG. 1, a relay station may communicate with the AP 110a and a UE 120r in order to facilitate communication between the AP 110a and the UE 120r. The relay station may also be referred to as an IAB node, a relay AP, a relay, etc.

The wireless communication network 100 may be a heterogeneous network that includes APs 110 of different types, e.g., macro AP, pico AP, femto AP, relays, etc. These different types of APs 110 may have different transmit power levels, different coverage areas, and different impact on interference in the wireless communication network 100. For example, the macro AP may have a high transmit power level (e.g., 20 Watts) whereas the pico AP, the femto AP, and the relays may have a lower transmit power level (e.g., 1 Watt).

The wireless communication network 100 may support synchronous or asynchronous operation. For synchronous operation, the APs 110 may have similar frame timing, and transmissions from the different APs 110 may be approximately aligned in time. For asynchronous operation, the APs 110 may have different frame timing, and transmissions from the different APs 110 may not be aligned in time. The techniques described herein may be used for both synchronous and asynchronous operation.

A network controller 130 may couple to a set of APs 110 and provide coordination and control for these APs 110. The network controller 130 may communicate with the APs 110 via a backhaul. The APs 110 may also communicate with one another (e.g., directly or indirectly) via wireless or wireline backhaul.

The UEs 120 (e.g., 120x, 120y, etc.) may be dispersed throughout the wireless communication network 100, and each UE 120 may be stationary or mobile. The UE 120 may also be referred to as a mobile station, a terminal, an AT, a subscriber unit, a station, a customer premises equipment (CPE), a cellular phone, a smart phone, a PDA, a wireless modem, a wireless communication device, a handheld device, a laptop computer, a cordless phone, a WLL station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, an industrial manufacturing equipment, a global positioning system device, or any other suitable device that is configured to communicate via a wireless or wired medium. Some UEs 120 may be considered machine-type communication (MTC) devices or evolved MTC (eMTC) devices. The MTC and the eMTC UEs may include, for example, robots, drones, remote devices, sensors, meters, monitors, location tags, etc., that may communicate with the AP 110, another device (e.g., remote device), or some other entity. A wireless node may provide, for example, connectivity for or to a network (e.g., a wide area network such as Internet or a cellular network) via a wired or wireless communication link. Some UEs 120 may be considered Internet-of-Things (IoT) devices, which may be narrowband IoT (NB-IoT) devices.

Certain wireless networks (e.g., LTE) utilize orthogonal frequency division multiplexing (OFDM) on DL and single-carrier frequency division multiplexing (SC-FDM) on UL. The OFDM and the SC-FDM partition the system bandwidth into multiple (K) orthogonal subcarriers, which are also commonly referred to as tones, bins, etc. Each subcarrier may be modulated with data. In general, modulation symbols are sent in a frequency domain with the OFDM and in a time domain with the SC-FDM. The spacing between adjacent subcarriers may be fixed, and a total number of subcarriers (K) may be dependent on a system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for the system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for the system bandwidth of 1.25, 2.5, 5, 10 or 20 MHz, respectively.

While aspects of the examples described herein may be associated with the LTE technologies, aspects of the present disclosure may be applicable with other wireless communications systems, such as the NR. The NR may utilize the OFDM with a CP on the UL and the DL, and may include support for half-duplex operation using time division duplex (TDD). Beamforming may be supported and beam direction may be dynamically configured. Multiple-input and multiple-output (MIMO) transmissions with precoding may also be supported. MIMO configurations in the DL may support up to 8 transmit antennas with multi-layer DL transmissions up to 8 streams and up to 2 streams per UE 120. Multi-layer transmissions with up to 2 streams per UE 120 may be supported. Aggregation of multiple cells may be supported with up to 8 serving cells.

In some examples, access to the air interface may be scheduled. A scheduling entity (e.g., the AP 110) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. The APs 110 are not the only entities that may function as a scheduling entity. In some examples, the UE 120 may function as the scheduling entity and may schedule resources for one or more subordinate entities (e.g., one or more other UEs 120), and the other UEs 120 may utilize the resources scheduled by the UE 120 for wireless communication. In some examples, the UE 120 may function as the scheduling entity in a peer-to-peer (P2P) network, and/or in a mesh network. In a mesh network example, the UEs 120 may communicate directly with one another in addition to communicating with the scheduling entity.

In FIG. 1, a solid line with double arrows indicates desired transmissions between the UE 120 and the serving AP 110, which is the AP 110 designated to serve the UE 120 on the DL and/or the UL. A finely dashed line with double arrows indicates interfering transmissions between the UE 120 and the AP 110.

Figure 2:
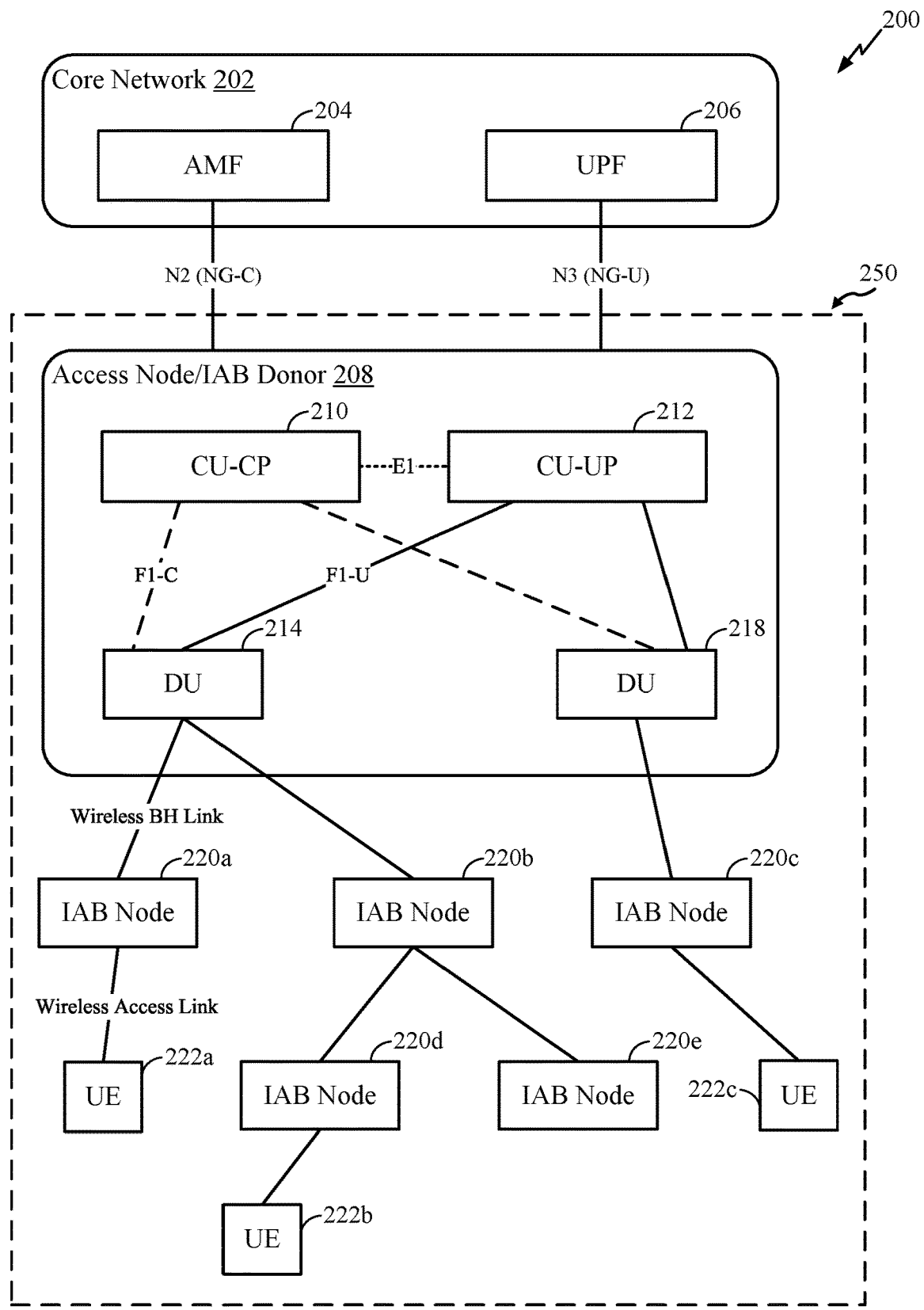
FIG. 2 is a block diagram conceptually illustrating an example architecture of a distributed radio access network (RAN), in accordance with certain aspects of the present disclosure.

FIG. 2 illustrates an example architecture of a distributed radio access network (RAN) 200 The distributed RAN 200 may include an example IAB network 250, which may be implemented in the wireless communication network 100 illustrated in FIG. 1. As shown in FIG. 2, the distributed RAN 200 includes core network (CN) 202 and access node (AN) configured as an IAB donor node 208.

As shown in FIG. 2, the IAB network 250 includes the IAB donor node 208. The IAB donor node 208 is a RAN node (e.g., access point/gNB that terminates the NR Ng interface with the CN 202 (e.g., next generation NG core)), and is generally connected to the CN 202 via a wireline backhaul link. The CN 202 may host core network functions. The CN 202 may be centrally deployed. The CN 202 functionality may be offloaded (e.g., to advanced wireless services (AWS)), in an effort to handle peak capacity. The CN 202 may include access and mobility management function (AMF) 204 and user plane function (UPF) 206. The AMF 204 and the UPF 206 may perform one or more of the CN 202 functions.

The IAB donor node 208 may communicate with the CN 202 (e.g., via a backhaul interface). The IAB donor node 208 may communicate with the AMF 204 via an N2 (e.g., NG-C) interface. The IAB donor node 208 may communicate with the UPF 206 via an N3 (e.g., NG-U) interface. The IAB donor node 208 may include a central unit-control plane (CU-CP) 210, one or more central unit-user plane (CU-UPs) 212, one or more distributed units (DUs) 214, 218, and one or more antenna/remote radio units (AU/RRUs) (not shown). The CUs and DUs may also be referred to as gNB-CU and gNB-DU, respectively.

The IAB donor node 208 may also be referred to as an IAB anchor node and may include an IAB central unit (e.g., NR CU) or an IAB Distributed Unit (e.g., NR DU). The IAB network 250 further includes one or more non-donor IAB nodes (e.g., 220a-220e). Each IAB node (including donor and non-donor IAB nodes) may serve one or more UEs (e.g., 222a-222c) connected to an IAB node. As shown, the IAB nodes, including the IAB donor node 208, may be connected via wireless backhaul links (e.g., NR wireless backhaul links or backup NR wireless backhaul links). Each IAB node connects to its served UEs via respective access links.

Each IAB node is the RAN node (e.g., access point/gNB) that provides IAB functionality with two roles including data unit function (DU-F) and a mobile termination function (MT-F). The DU-F of the IAB node is generally responsible for scheduling UEs (e.g., served by the IAB node) and other IAB nodes (e.g., that are connected as child nodes to the IAB node). The DU-F also controls both access and backhaul links under its coverage. The MT-F of the IAB node is controlled and scheduled by the IAB donor node 208 or another IAB node as its parent IAB node. In an aspect, the IAB donor node 208 only includes DU-F and no MT-F.

The CU-CP 210 may be connected to one or more of the DUs 214, 218. The CU-CP 210 and the DUs 214, 218 may be connected via a wireline interface using F1-C protocols. As shown in FIG. 2, the CU-CP 210 may be connected to multiple DUs, but the DUs 214, 218 may be connected to only one CU-CP. Although FIG. 2 only illustrates one CU-UP 212, the IAB donor node 208 may include multiple CU-UPs. The CU-CP 210 selects the appropriate CU-UP(s) for requested services (e.g., for the UE). The CU-UP(s) 212 may be connected to the CU-CP 210. For example, the CU-UP(s) 212 and the CU-CP 210 may be connected via an E1 interface. The CU-CP(s) 212 may be connected to one or more of the DUs 214, 218. The CU-UP(s) 212 and DUs 214, 218 may be connected via a F1-U interface. As shown in FIG. 2, the CU-CP 210 may be connected to multiple CU-UPs, but the CU-UPs may be connected to only one CU-CP.

The DU, such as DUs 214 and/or 218, may host one or more transmit/receive points (TRP(s)), which may include an edge node (EN), an edge unit (EU), a radio head (RH), a smart radio head (SRH), or the like). The DU may be located at edges of the network with RF functionality. The DUs 214, 218 may be connected to multiple CU-UPs 212 that are connected to (e.g., under the control of) the same CU-CP (e.g., for RAN sharing, radio as a service (RaaS), and service specific deployments). The DUs 214, 218 may be configured to individually (e.g., dynamic selection) or jointly (e.g., joint transmission) serve traffic to the UE. Each DU 214, 218 may be connected with one of AU/RRUs.

The CU-CP 210 may be connected to multiple DU(s) 214, 218 that are connected to (e.g., under control of) the same CU-UP 212. Connectivity between the CU-UP 212 and the DU 214, 218 may be established by the CU-CP 210. For example, the connectivity between the CU-UP 212 and the DU 214, 218 may be established using Bearer Context Management functions. Data forwarding between the CU-UP(s) 212 may be via a Xn-U interface.

The distributed RAN 200 may support fronthauling solutions across different deployment types. For example, the distributed RAN 200 architecture may be based on transmit network capabilities (e.g., bandwidth, latency, and/or jitter). The distributed RAN 200 may share features and/or components with the LTE. For example, the IAB donor node 208 may support dual connectivity with the NR and may share a common fronthaul for the LTE and the NR. The distributed RAN 200 may enable cooperation between and among the DUs 214, 218, for example, via the CU-CP 212. An inter-DU interface may not be used.

Logical functions may be dynamically distributed in the distributed RAN 200. As will be described in more detail with reference to FIG. 4, the RRC layer, Packet Data Convergence Protocol (PDCP) layer, Radio Link Control (RLC) layer, Medium Access Control (MAC) layer, Physical (PHY) layers, and/or RF layers may be adaptably placed, in the AN and/or the UE.

Figure 3:
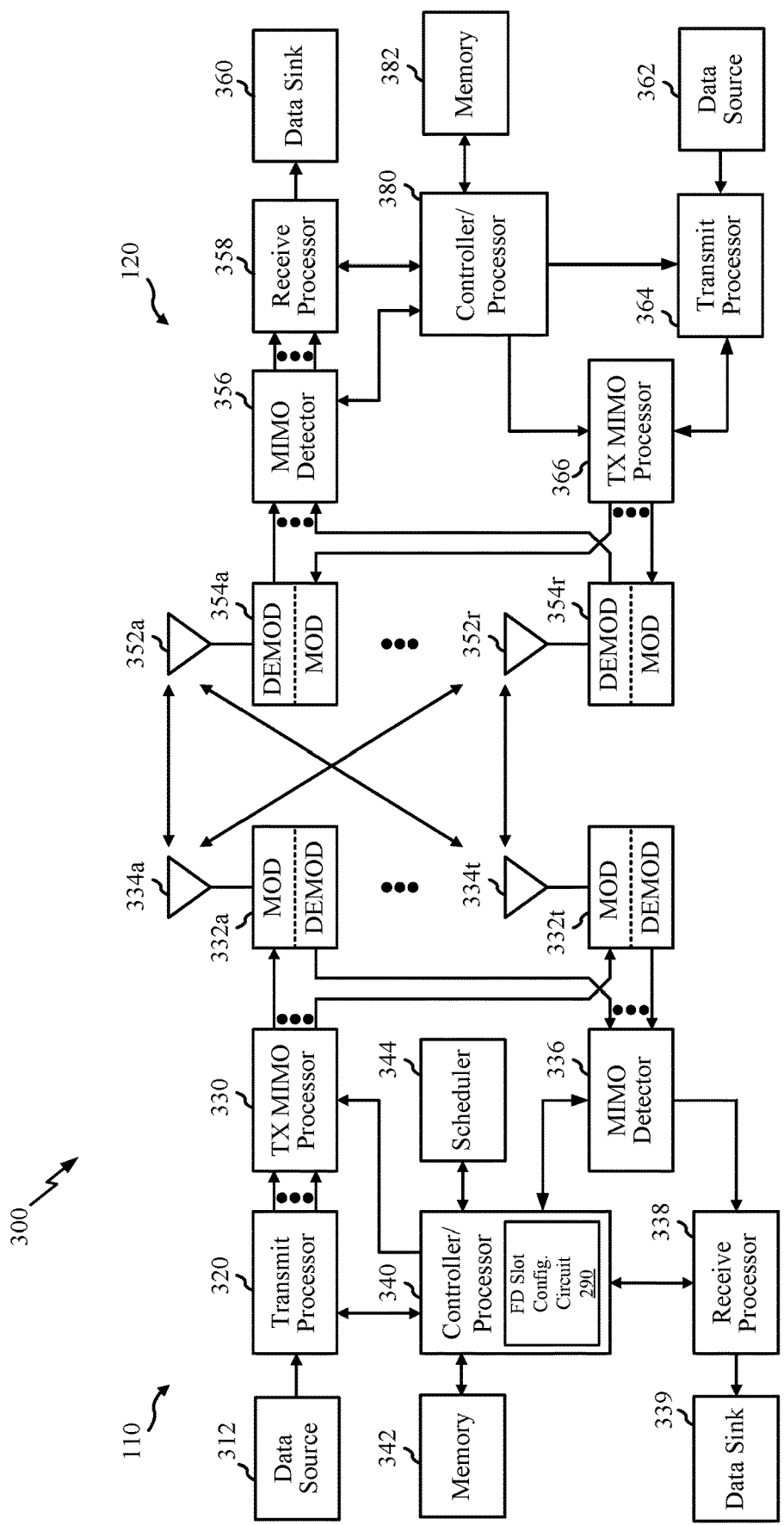
FIG. 3 illustrates example components of a base station (BS) and a user equipment (UE), in accordance with certain aspects of the present disclosure.

FIG. 3 illustrates example components 300 of AP 110 and UE 120 (as depicted in FIG. 1), which may be used to implement aspects of the present disclosure. For example, antennas 352, processors 366, 358, 364, and/or a controller/processor 380 of the UE 120 and/or antennas 334, processors 320, 330, 338, and/or a controller/processor 340 of the AP 110 may be used to perform various techniques and methods described herein. For example, as shown in FIG. 3, the processor 340 includes an full-duplex (FD) slot configuration circuit 290 that may be configured for full-duplex slot configuration in an IAB communication systems, according to aspects described herein. In certain aspects, the FD slot communication circuit 290 enables the processor 340 to detect a change in one or more traffic parameters, and dynamically modify a slot pattern based on the change in the one or more traffic parameters. In certain aspects, the AP 110 may be an IAB donor node, a parent node, and/or an IAB child node.

At the AP 110, a transmit processor 320 may receive data from a data source 312 and control information from the controller/processor 340. The control information may be for a physical broadcast channel (PBCH), a physical control format indicator channel (PCFICH), a physical hybrid ARQ indicator channel (PHICH), a physical downlink control channel (PDCCH), a group common PDCCH (GC PDCCH), etc. The data may be for a physical downlink shared channel (PDSCH), etc. The transmit processor 320 may process (e.g., encode and symbol map) the data and the control information to obtain data symbols and control symbols, respectively. The transmit processor 320 may also generate reference symbols, e.g., for the primary synchronization signal (PSS), secondary synchronization signal (SSS), and cell-specific reference signal (CRS). A transmit MIMO processor 330 may perform spatial processing (e.g., precoding) on the data symbols, the control symbols, and/or the reference symbols, if applicable, and may provide output symbol streams to the modulators (MODs) 332a through 332t. Each MOD 332 may process a respective output symbol stream (e.g., for OFDM, etc.) to obtain an output sample stream. Each MOD 332 may further process (e.g., convert to analog, amplify, filter, and upconvert) the output sample stream to obtain a DL signal. The DL signals from the MODs 332a through 332t may be transmitted via the antennas 334a through 334t, respectively.

At the UE 120, the antennas 352a through 352r may receive the DL signals from the AP 110 and may provide received signals to the demodulators (DEMODs) in transceivers 354a through 354r, respectively. Each DEMOD in the transceiver 354 may condition (e.g., filter, amplify, downconvert, and digitize) a respective received signal to obtain input samples. Each DEMOD in the transceiver 354 may further process the input samples (e.g., for OFDM, etc.) to obtain received symbols. A MIMO detector 356 may obtain received symbols from all the DEMODs in the transceivers 354a through 354r, to perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the UL, at the UE 120, a transmit processor 364 may receive and process data (e.g., for a physical uplink shared channel (PUSCH)) from a data source 362 and control information (e.g., for a physical uplink control channel (PUCCH)) from the controller/processor 380. The transmit processor 364 may also generate reference symbols for a reference signal (e.g., for the sounding reference signal (SRS)). The symbols from the transmit processor 364 may be precoded by a TX MIMO processor 366 if applicable, further processed by the DEMODs in the transceivers 354a through 354r (e.g., for SC-FDM, etc.), and transmitted to the AP 110. At the AP 110, the UL signals from the UE 120 may be received by the antennas 334, processed by the MODs 332, detected by a MIMO detector 336 if applicable, and further processed by a receive processor 338 to obtain decoded data and control information sent by the UE 120. The receive processor 338 may provide the decoded data to a data sink 339 and the decoded control information to the controller/processor 340.

The controllers/processors 340 and 380 may direct the operation at the AP 110 and the UE 120, respectively. The processor 340 and/or other processors and modules at the AP 110 may perform or direct the execution of processes for the techniques described herein. Memories 342 and 382 may store data and program codes for the AP 110 and the UE 120, respectively. A scheduler 344 may schedule the UEs for data transmission on the DL and/or the UL.

Figure 4:
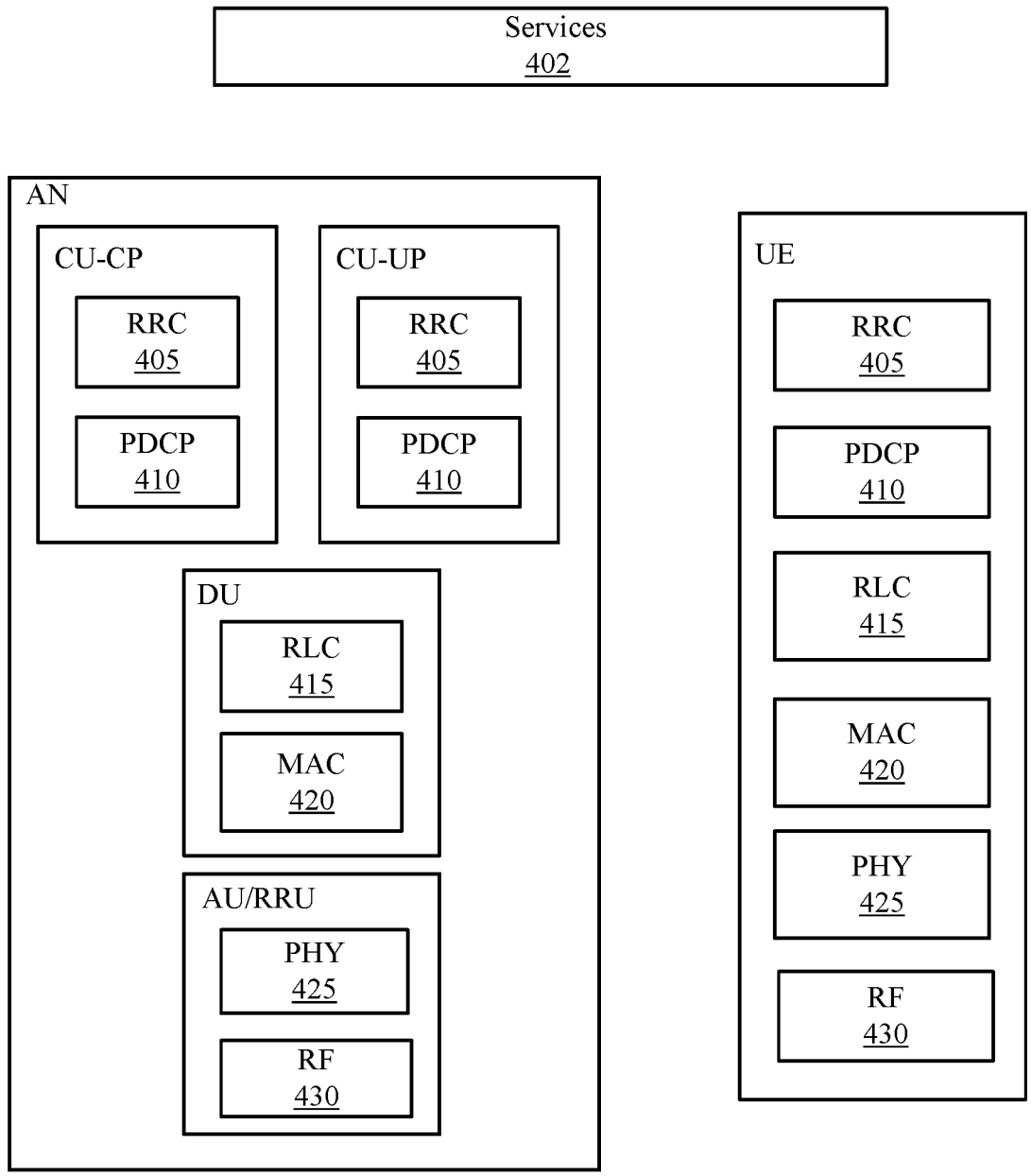
FIG. 4 is a block diagram illustrating an example communications protocol stack in a RAN, in accordance with certain aspects of the present disclosure.

FIG. 4 illustrates a diagram showing examples for implementing a communications protocol stack 400 in a RAN (e.g., such as the RAN 200), according to aspects of the present disclosure. The communications protocol stack 400 may be implemented by devices operating in a wireless communication system, such as a 5G NR system (e.g., the wireless communication network 100 of FIG. 1). In various examples, layers of the communications protocol stack 400 may be implemented as separate modules of software, portions of a processor or application specific integrated circuit (ASIC), portions of non-collocated devices connected by a communications link, or various combinations thereof. Collocated and non-collocated implementations may be used, for example, in a protocol stack for a network access device or a UE. As shown in FIG. 4, the wireless communication system may support various services 402 over one or more protocols. One or more protocol layers of the communications protocol stack 400 may be implemented by an AN (e.g., AN 208 in FIG. 2, or AP 110a in FIG. 1) and/or the UE (e.g., UE 120).

As shown in FIG. 4, the communications protocol stack 400 is split in the AN. A RRC layer 405, a PDCP layer 410, a RLC layer 415, a MAC layer 420, a PHY layer 425, and a RF layer 430 may be implemented by the AN. For example, the CU-CP (e.g., CU-CP 210 in FIG. 2) and the CU-UP e.g., CU-UP 212 in FIG. 2) each may implement the RRC layer 405 and the PDCP layer 410. A DU (e.g., DUs 214 and 218 in FIG. 2) may implement the RLC layer 415 and the MAC layer 420. However, the DU may also implement the PHY layer(s) 425 and the RF layer(s) 430 via an AU/RRU connected to the DU. The PHY layers 425 may include a high PHY layer and a low PHY layer.

The UE (e.g., UE 222a-222c) may implement the entire communications protocol stack 400 (e.g., the RRC layer 405, the PDCP layer 410, the RLC layer 415, the MAC layer 420, the PHY layer(s) 425, and the RF layer(s) 430).

Figure 5:
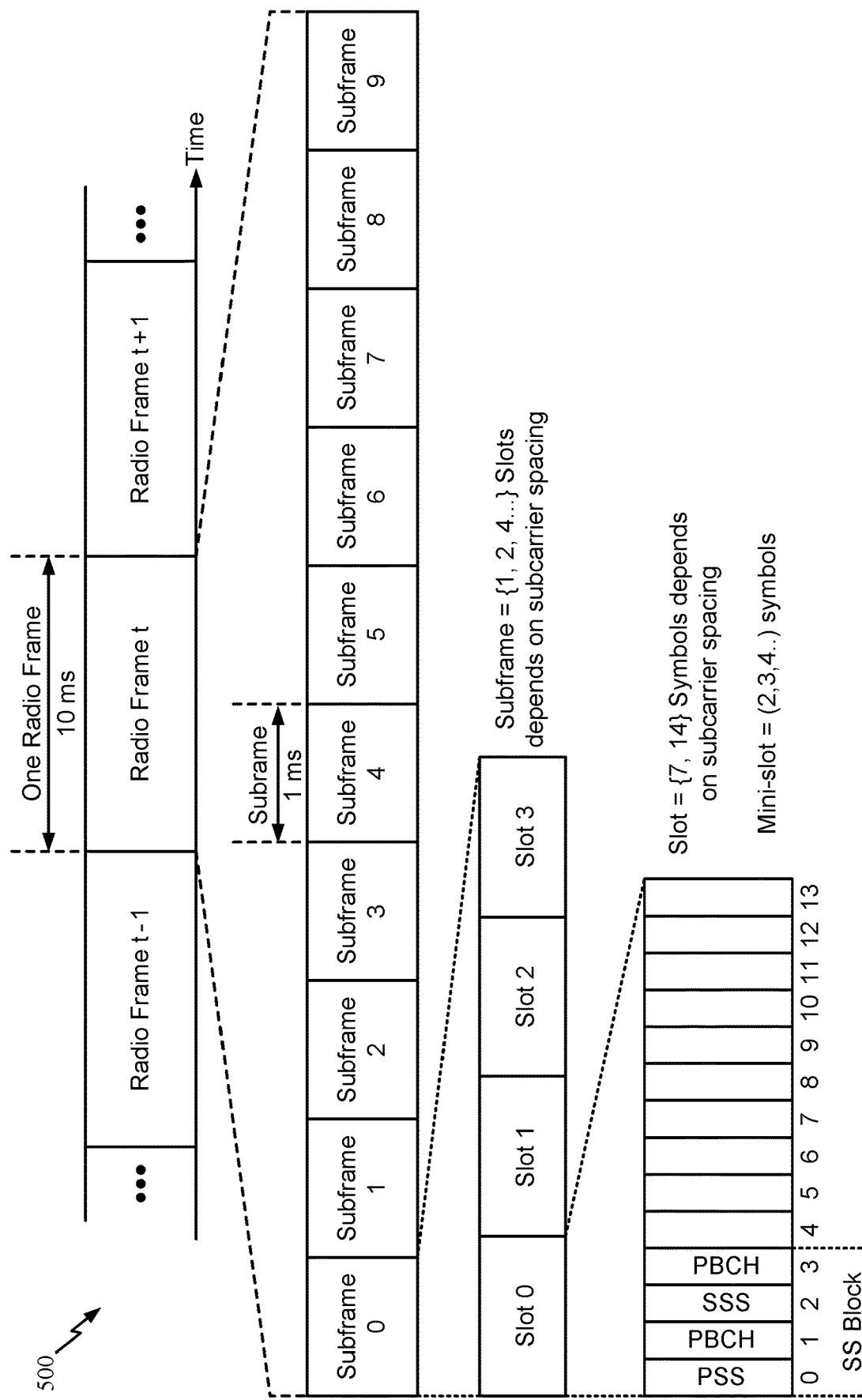
FIG. 5 is a block diagram is a diagram illustrating an example of a frame format for new radio (NR), in accordance with certain aspects of the present disclosure.

FIG. 5 is a diagram showing an example of a frame format 500 for a NR. The transmission timeline for each of DL and UL may be partitioned into units of radio frames. Each radio frame may have a predetermined duration (e.g., 10 ms), and may be partitioned into 10 subframes, each of 1 ms, with indices of 0 through 9. Each subframe may include a variable number of slots depending on subcarrier spacing.

Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., the DL, the UL, or flexible) for data transmission and the link direction for each subframe may be dynamically switched. The link directions may be based on a slot format. Each slot may include DL/UL data as well as DL/UL control information.

In the NR, a synchronization signal (SS) block is transmitted. The SS block includes a PSS, a SSS, and a two symbol PBCH. The SS block can be transmitted in a fixed slot location, such as the symbols 0-3 as shown in FIG. 5. The PSS and the SSS may be used by UEs for cell search and acquisition. The PSS may provide half-frame timing, the SS may provide CP length and frame timing. The PSS and the SSS may provide cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs) such as system information block type 1 (SIB1), other system information (OSI) can be transmitted on a PDSCH in certain subframes. The SS block can be transmitted up to sixty-four times, for example, with up to sixty-four different beam directions for mmW. The up to sixty-four transmissions of the SS block are referred to as the SS burst set. The SS blocks in an SS burst set are transmitted in a same frequency region, while the SS blocks in different SS bursts sets can be transmitted at different frequency locations.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through a scheduling entity (e.g., UE or AP), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a RRC dedicated state, etc.) or a configuration associated with transmitting pilots using a common set of resources (e.g., an RRC common state, etc.). When operating in the RRC dedicated state, the UE may select the dedicated set of resources for transmitting a pilot signal to a network. When operating in the RRC common state, the UE may select the common set of resources for transmitting the pilot signal to the network. In either case, the pilot signal transmitted by the UE may be received by one or more network access devices, such as an AN, or a DU, or portions thereof. Each receiving network access device may be configured to receive and measure the pilot signals transmitted on the common set of resources, and also receive and measure the pilot signals transmitted on the dedicated sets of resources allocated to the UEs for which the network access device is a member of a monitoring set of network access devices for the UE. One or more of the receiving network access devices, or a CU to which the receiving network access device(s) transmit the measurements of the pilot signals, may use the measurements to identify serving cells for the UEs, or to initiate a change of the serving cell for one or more of the UEs.

Example Directional Repeater

Next generation (5G) wireless networks have stated objectives to provide ultra-high data rate and support wide scope of application scenarios. IAB systems have been studied in 3GPP as one possible solution to help support these objectives.

As noted above, in the IAB system, a wireless backhaul solution is adopted to connect cells (IAB-nodes) to a core network (which uses a wired backhaul). Some attractive characteristics of the IAB system are support for multi-hop wireless backhaul, sharing of a same technology (e.g., NR) and resources (e.g., frequency bands) for both access and backhaul links.

There are various possible architectures for the IAB-nodes, including layer-2 (L2) and layer-3 (L3) solutions, and a particular architecture deployed may depend on what layers of protocol stack are implemented in intermediate nodes (IAB-nodes), for example, L2 relays may implement PHY/MAC/RLC layers.

Certain aspects of the present disclosure relate to L1 relays (referred to as repeaters). L1 relays/repeaters may have many features. For example, such repeaters are relatively simple, low-cost, low-power, and are wirelessly connected to a donor or another relay (e.g., a gNB).

Figure 6:
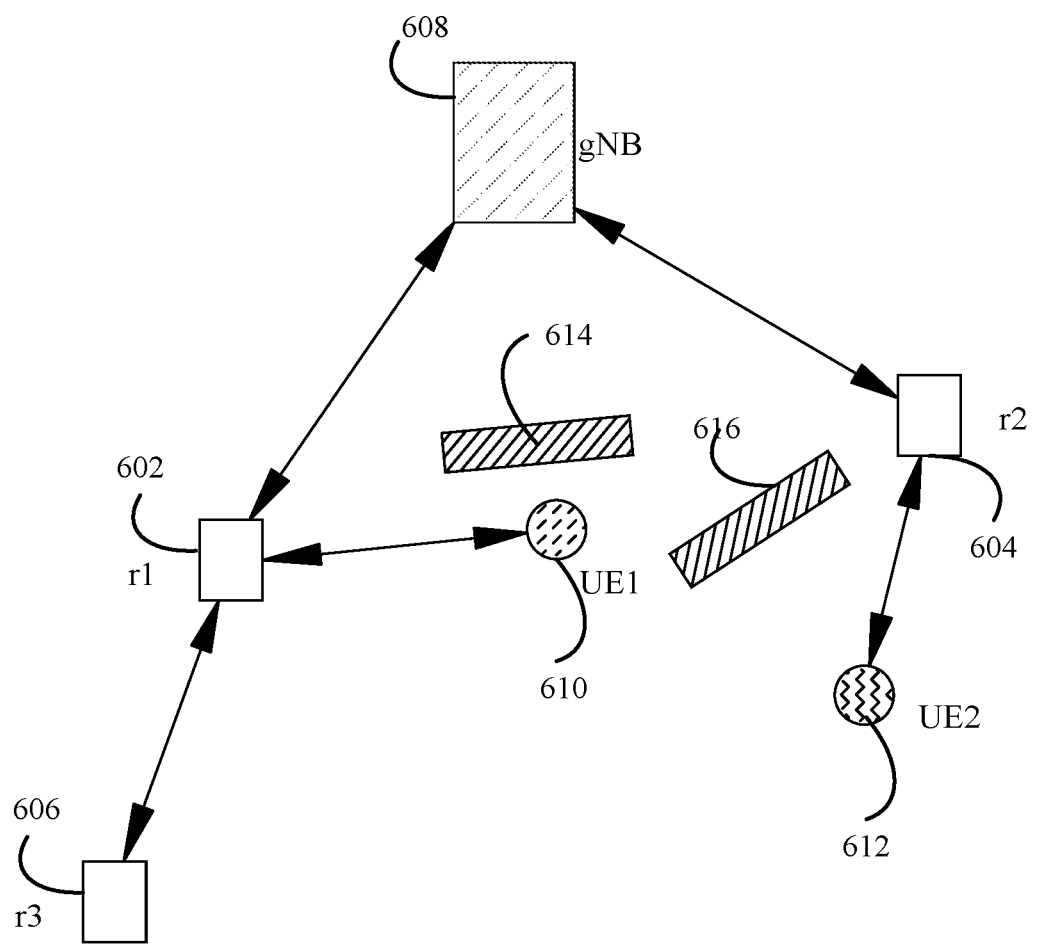
FIG. 6 is a block diagram of an example wireless system deploying repeaters, in which aspects of the present disclosure may be implemented.

FIG. 6 illustrates one example application of how repeaters may be used to help improve coverage by overcoming blockage (for instance, obstruction of RF signals by an object). It is generally understood that the blockage is a major issue in millimeter wave (MMW) where beamforming is used to send directional RF signals. In the illustrated example, repeaters (for example, r1 602, r2 604, and r3 606) may allow a gNB 608 to serve UEs (for example, UE1 610 and UE2 612) even though objects (for example, a first object 614 and a second object 616) may prevent gNB directional RF signals from reaching the UEs.

As illustrated, because the r1 602 is not blocked by the objects, the r1 602 may receive the RF signals from the gNB 608 and re-transmit the RF signals to reach the UE1 610 (although the UE1 610 is blocked by the first object 614 from receiving the RF signals directly from the gNB 608). Similarly, because the r2 606 is not blocked by the objects, the r2 606 may receive the RF signals from the gNB 608 and re-transmit the RF signals to reach the UE2 612 (although the UE2 612 is blocked by the second object 616 from receiving the RF signals directly from the gNB 608). As demonstrated by this example, L1 repeaters may serve as relatively simple and inexpensive solutions to provide protection against the blockage by the objects, extend the coverage of a MMW cell, and fill coverage holes.

Figure 7A:
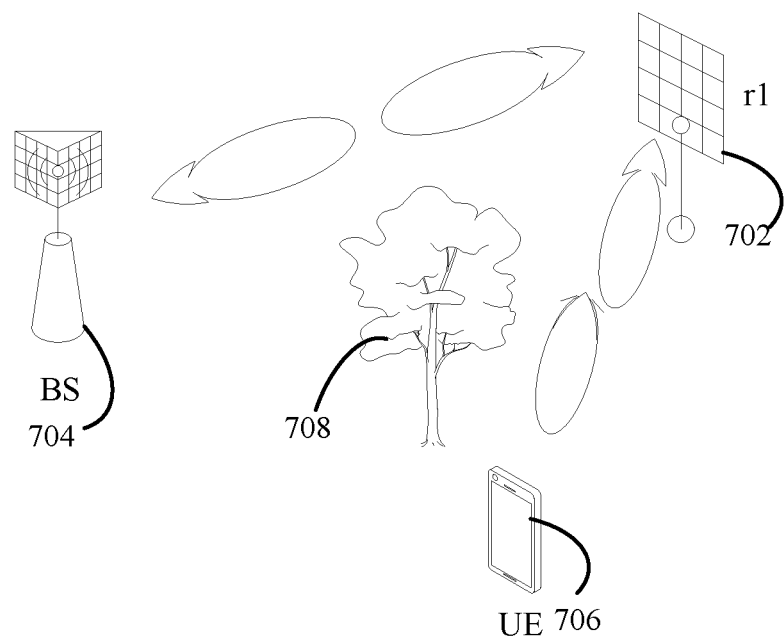
FIGS. 7A and 7B illustrate an example scenario, in which aspects of the present disclosure may be implemented.
Figure 7B:
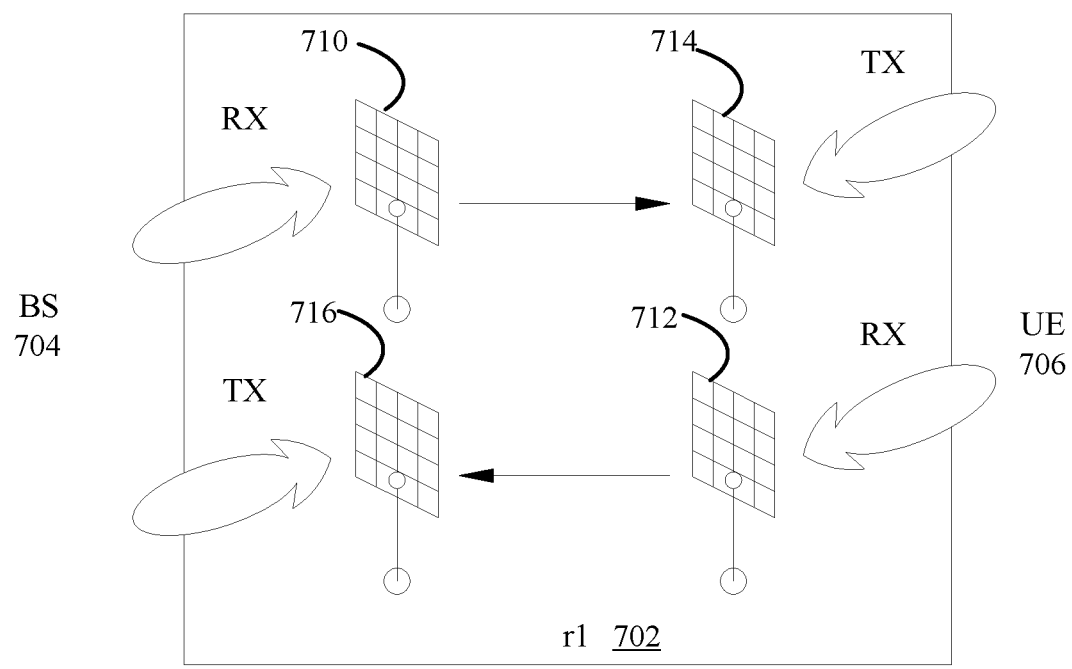

FIGS. 7A and 7B provide additional details of how repeaters may help effectively overcome challenge of a blockage by one or more objects. As illustrated in FIG. 7A, a traditional repeater receives an RF signal in one panel (corresponding to a receive or Rx beam) and (re-)transmits the RF signal in another panel (corresponding to a transmit or Tx beam). For example, the repeater simply amplifies the received RF signal and forwards the RF signal to become the transmitted RF signal (Amplify-and-forward).

In the example illustrated in FIG. 7A, a repeater r1 702 is able to receive the RF signal (for example, during DL) from a BS 704 and relay the RF signal to a UE 706, which may be blocked from receiving the RF signal directly from the BS 704 due to a presence of an object 708 (for example, a tree) between the BS 704 and the UE 706. In other direction (for example, during UL), the repeater r1 702 may receive the RF signal from the UE 706 and relay the RF signal to the BS 704.

As illustrated in FIG. 7B, the repeater r1 702 may include receive panels (for example, a first receive panel 710 and a second receive panel 712) and transmit panels (for example, a first transmit panel 714 and a second transmit panel 716), which may be used to implement some fixed beam patterns. For wide coverage, the beam patterns are usually wide, therefore not achieving high array gains. The repeater r1 702 is typically not aware of whether the RF signal is a DL signal or an UL signal in a TDD system, and operates in both directions (full duplex) simultaneously.

Figure 8:
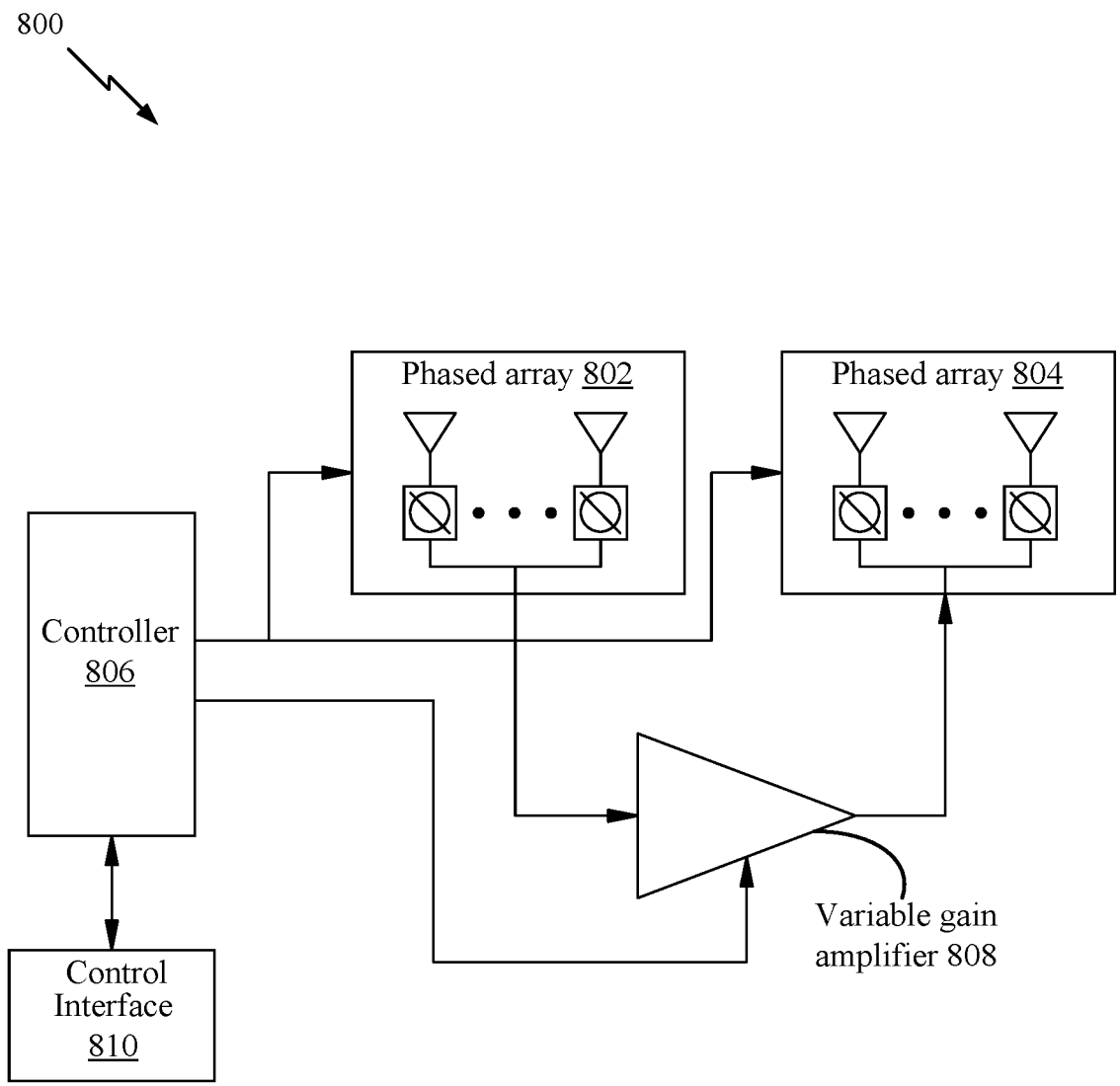
FIG. 8 is a block diagram of an example architecture for a directional repeater.

FIG. 8 illustrates a schematic view of an example architecture 800 for a repeater (e.g., an L1 repeater). As noted above, the repeater may perform operations of receiving an analog RF signal on its receiver (RX) antennas (e.g., based on some configured RX beamforming), amplifying power of the received analog RF signal, and transmitting the amplified analog RF signal from its transmitter (TX) antennas (e.g., based on some configured TX beamforming).

As illustrated, beamforming may be accomplished via phased antenna arrays (for example, a first phased antenna array 802 and a second phased antenna array 804) configured by a controller 806, while the amplification may be accomplished by a variable gain amplifier 808. The repeater may also communicate some control signals with a server (e.g., a BS serving as a donor, a control node, etc.) via a control interface 810. The control interface 810 may be implemented out-of-band (e.g., operating outside a carrier frequency on which RX signal is received) or in-band (e.g., using a smaller bandwidth part of a same carrier frequency). An out-of-band control interface may be implemented, for example, via a separate (e.g. a low-frequency) modem using a different radio technology (for instance, a Bluetooth) or different frequency (for instance, LTE NB-IoT).

Example Smart Directional Repeater Initialization

Figure 9:
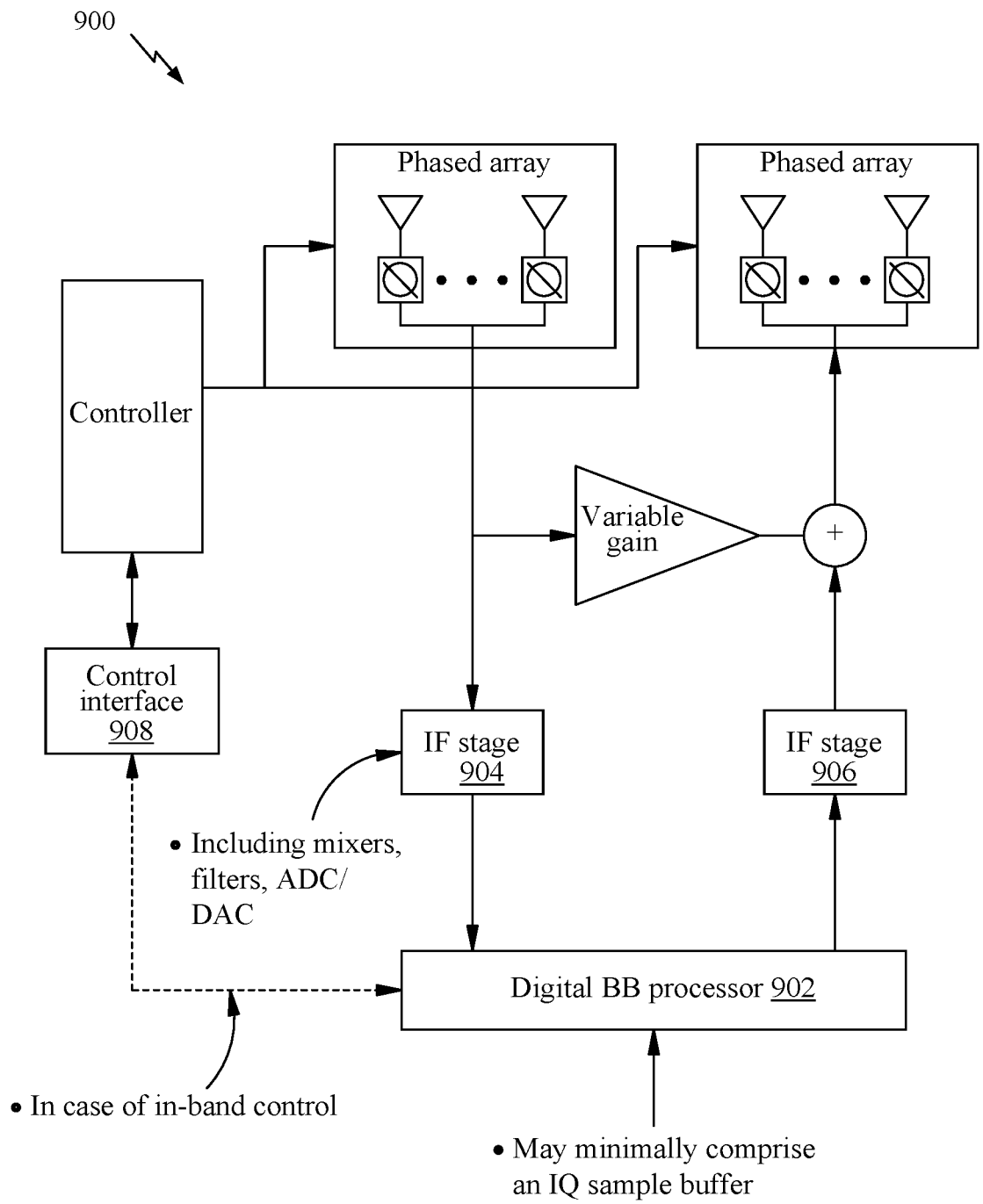
FIG. 9 is a block diagram of an example architecture for a directional repeater, in accordance with certain aspects of the present disclosure.

FIG. 9 shows an example architecture 900 for an enhanced repeater (for example, a smart repeater), in accordance with aspects of the present disclosure. As illustrated, the enhanced repeater may have additional components when compared to a base architecture of FIG. 8, which may allow the enhanced repeater, for example, to optimize beam selection for receiving and/or transmitting RF signals.

As illustrated, the enhanced repeater of FIG. 9 may have components that may allow the enhanced repeater to at least limited baseband processing. Such components may include a digital baseband (BB) processor 902 (with at least limited baseband capability, for example, relative to a UE or a gNB). The components of the enhanced repeater may also include intermediate frequency (IF) stages (for example, a first IF stage 904 and a second IF stage 906) including mixers, filters, analog-to-digital converters (ADCs), digital-to-analog converters (DACs), and the like designed to convert a received RF signal to an IF signal, take and store digital (IQ) samples, and generate the RF signal from the stored digital samples. For this purpose, the enhanced repeater may include at least sufficient storage to implement a buffer to store the IQ samples.

The enhanced repeater of FIG. 9 may also include a control interface 908 to receive control signaling from a BS (e.g., to indicate how to store and process digital samples). As described above, the control signaling may be in-band or out-of-band. In the case of the in-band control, the digital BB processor 902 may be used to extract the control signaling from the received RF signal. In some implementations, a right branch where the digital BB processor 902 produces an output to an IF stage (for example, the first IF stage 904 or the second IF stage 906) that gets summed with an analog path for an onward link, which may not exist (or be enabled) for a link to a UE from the smart repeater. On the other hand, for the link from the repeater to the gNB, this branch may be used to sum the signal coming from the UE (and going to the gNB) with any locally generated signal that the smart repeater has to concurrently send to the gNB.

Aspects of the present disclosure provide techniques for initializing enhanced directional repeaters, such as the smart repeater described above with reference to FIG. 9. By sharing information regarding capability to support receive and/or transmit beams, the smart repeater may be enhanced (relative to the architecture shown in FIG. 8) to provide better coverage and make more efficient use of time, frequency, and spatial resources.

As noted above, in a conventional (baseline) repeater architecture, a data-path may be completely analog. In other words, the repeater does not further process the analog RF signal to be relayed, rather the RF signal is forwarded in its analog form (without any digital BB processing).

In contrast, the smart repeater can be controlled by the BS (e.g., the eNB/gNB), for example, in terms of transmit and receive switching and beamforming to adjust beams of the smart repeater to beamform (for instance, steer/point transmissions) to/from a particular UE being served. In wireless communication systems, such as 5G, the UE scheduled at any particular instance is dynamic, meaning the optimal setting for the beamforming is also dynamic. The optimal beamforming settings, for example, may allow for a selection of broader beams, for example, for discovery or acquisition purposes, or narrower beams to increase antenna gain, receive power and signal to noise ratio (SNR).

Figure 10:
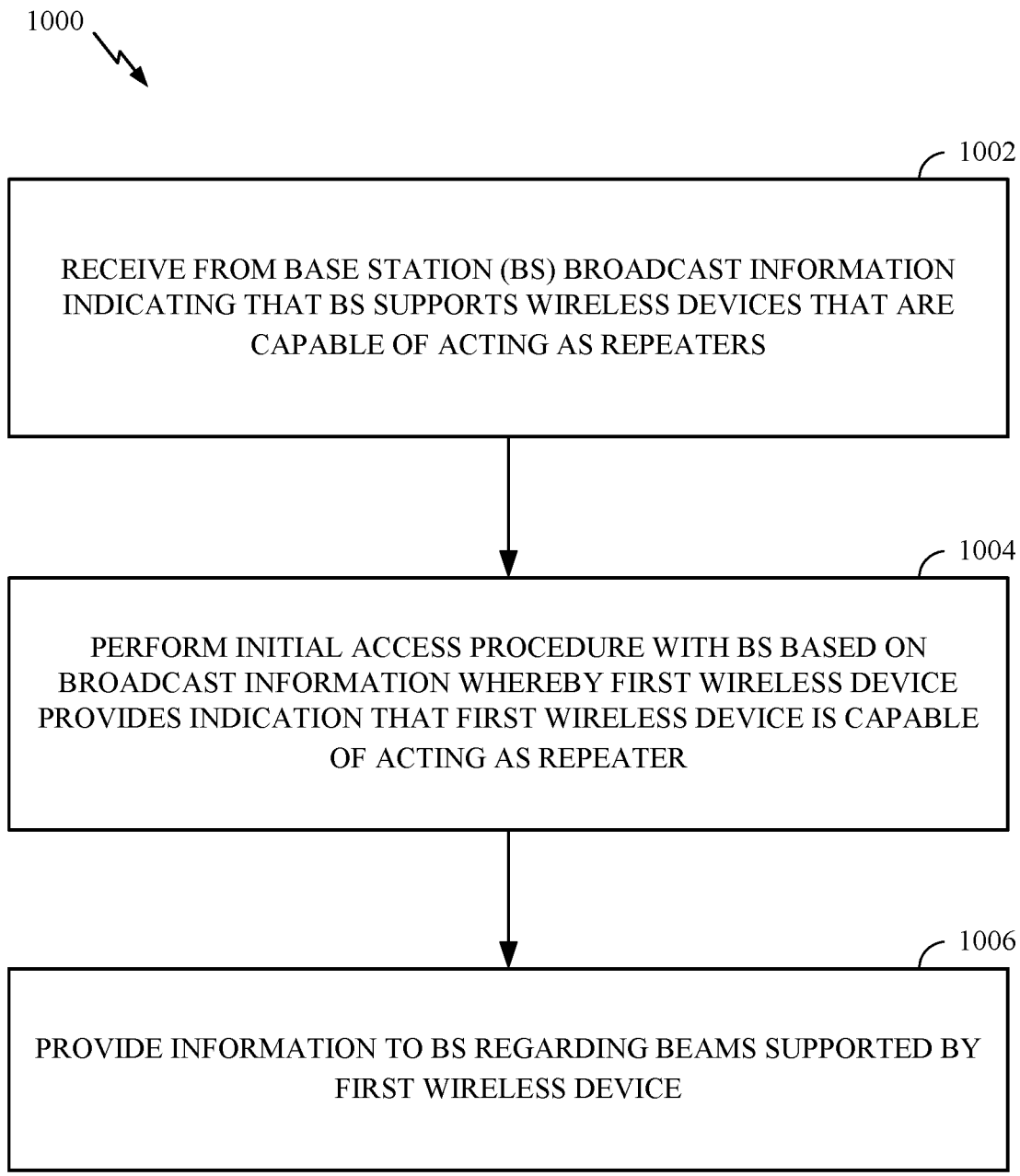
FIG. 10 illustrates example operations that may be performed by a directional repeater, in accordance with certain aspects of the present disclosure.
Figure 11:
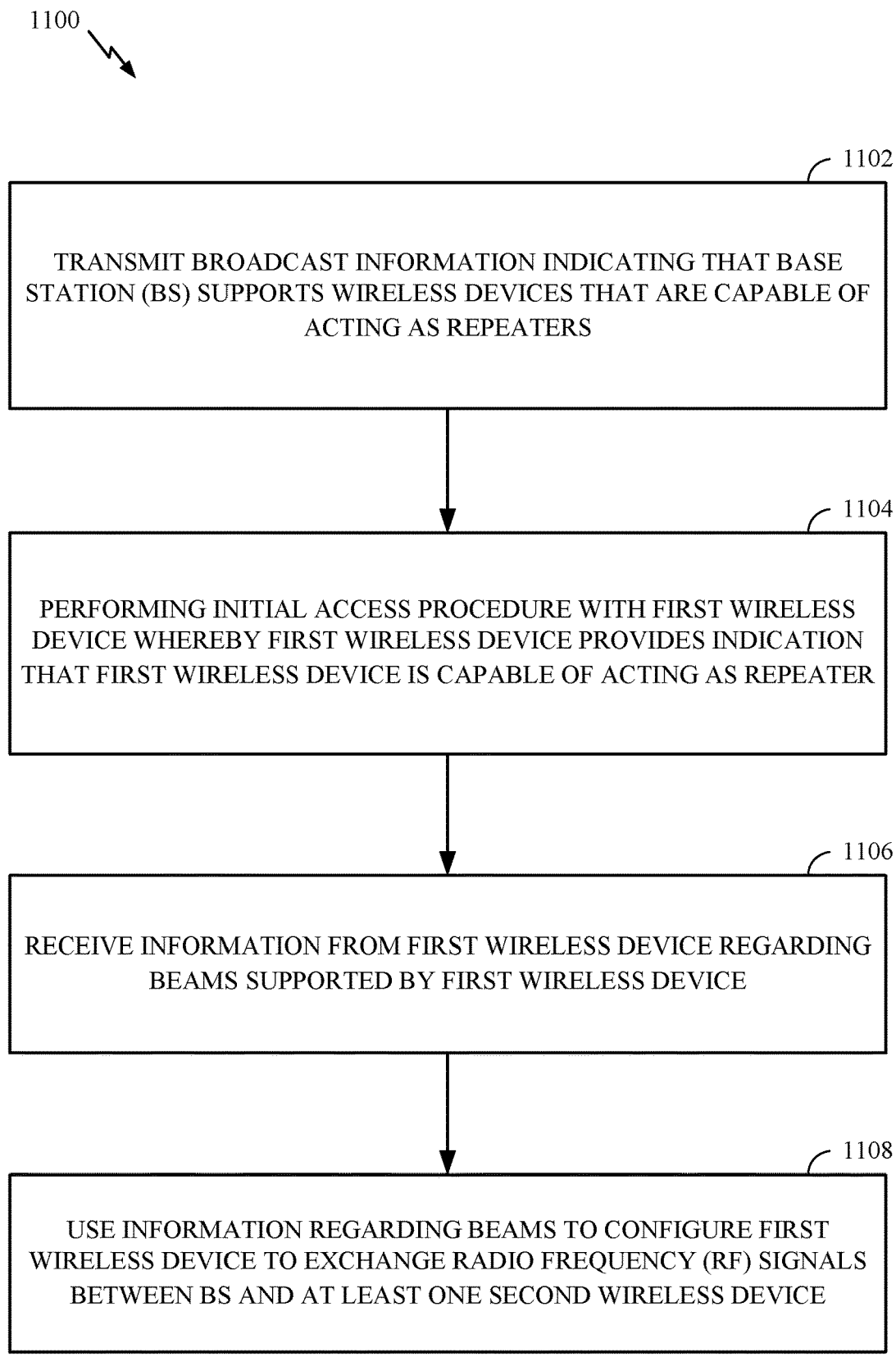
FIG. 11 illustrates example operations that may be performed by a BS, in accordance with certain aspects of the present disclosure.

FIGS. 10 and 11 illustrate example operations for initializing an enhanced directional repeater, from the repeater and a BS perspectives, respectively. The operations of FIGS. 10 and 11 may be described with reference to a call flow diagram of FIG. 12.

FIG. 10 illustrates example operations 1000 for wireless communication by a first wireless device, in accordance with certain aspects of the present disclosure. The operations 1000 may be performed, for example, by a repeater (e.g., any of the repeaters shown in FIG. 1, 6, 7, 9, or 12 or any electronic device acting as a repeater).

Operations 1000 begin, at 1002, by receiving, from a base station, broadcast information indicating that the BS supports wireless devices that are capable of acting as repeaters (e.g., by exchanging directional RF transmissions between the BS and other wireless devices and extracting control information from the RF transmissions from the BS). At 1004, the first wireless device performs an initial access procedure with the BS, based on the broadcast information, whereby the first wireless device provides an indication that the first wireless device is capable of acting as a repeater. At 1006, the first wireless device provides information to BS regarding beams supported by the first wireless device.

FIG. 11 illustrates example operations 1100 for wireless communication by a BS, in accordance with certain aspects of the present disclosure. The operations 1100 may be performed, for example, by any of the BSs/gNBs (as shown in FIG. 1, 6, 7, or 12) to initialize an enhanced repeater performing operations 1000.

Operations 1100 begin, at 1102, by transmitting broadcasting information indicating that the BS supports wireless devices that are capable of acting as repeaters (e.g., by exchanging directional RF transmissions between the BS and other wireless devices and extracting control information from the RF transmissions from the BS). At 1104, the base station performs an initial access procedure with a first wireless device, whereby the first wireless device provides an indication that the first wireless device is capable of acting as a repeater. At 1106, the BS receives information from the first wireless device regarding beams supported by the first wireless device. At 1108, the base station uses the information regarding the beams to configure the first wireless device to exchange RF signals between the BS and at least one second wireless device.

Figure 12:
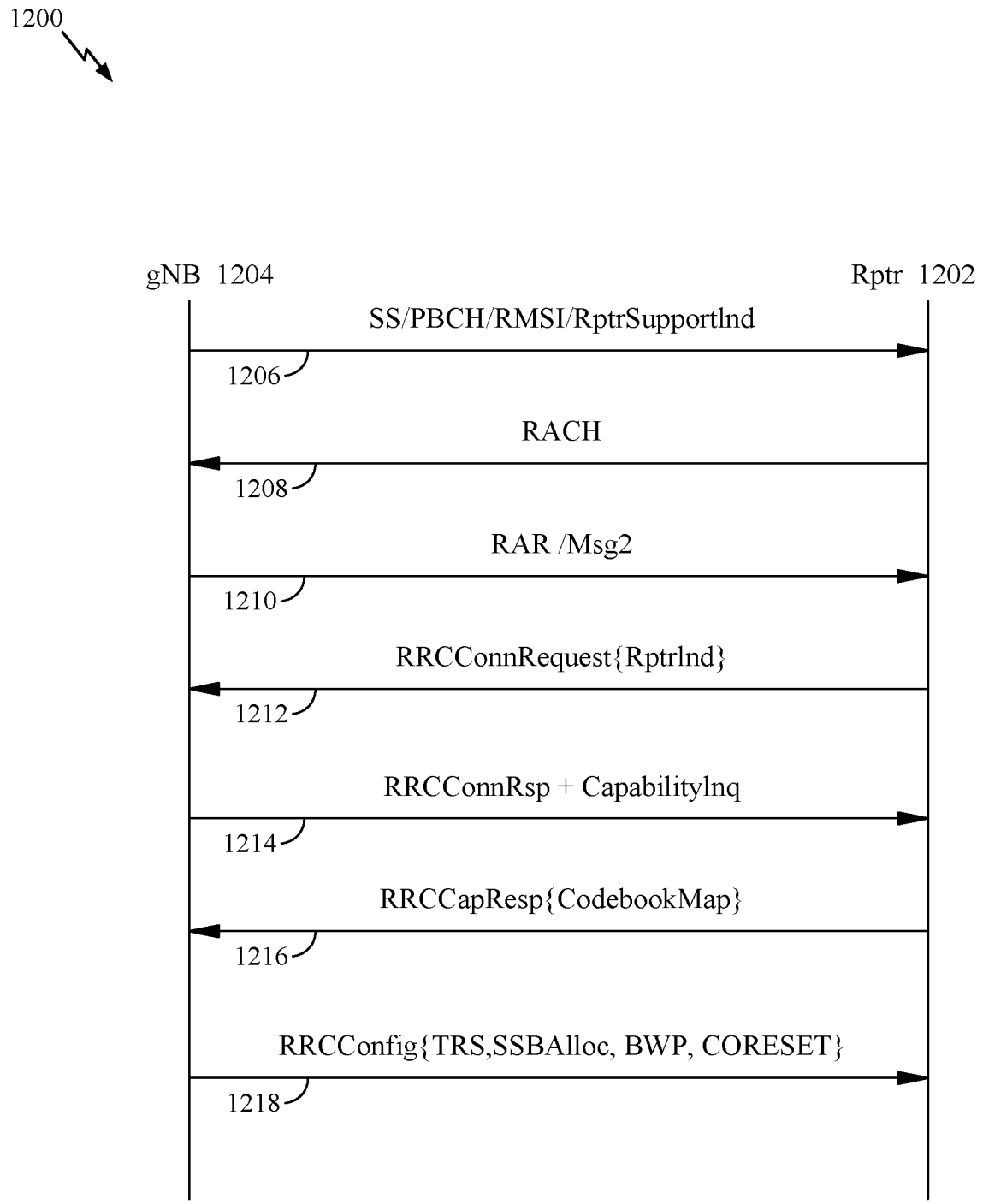
FIG. 12 is a call flow diagram illustrating example initialization of a directional repeater, in accordance with certain aspects of the present disclosure.

FIG. 12 is a call flow diagram illustrating example operations 1200 for initialization of an enhanced repeater (for example, a smart repeater) 1202 by a network entity, such as a BS (e.g., a gNB) 1204.

As illustrated in FIG. 12, in order to implement the repeater 1202 functionality proposed herein, various messages and signaling may first be exchanged between the repeater 1202 and the gNB 1204. The signaling may be RRC signaling for an access procedure, which may be used to establish a link between the gNB 1204 and the repeater 1202. In some cases, conventional RRC signaling may be modified to assist in the repeater 1202 initialization when the repeater 1202 is coming up and establishing the link with the gNB 1204.

At 1206, the gNB 1204 may provide an indication to the repeater 1202 that the gNB 1204 is capable of supporting the repeater 1202 (e.g., capable of providing control signaling as described above). Such a capability may be provided with synchronization signal blocks (SSBs) that are sent by the gNB 1204 sweeping over different beams in a broadcast manner (e.g., via RMSI or a SIB1). A new field (e.g., labeled "repeater support indication" in FIG. 12) may indicate that the gNB 1204 has an ability of specifically interacting with the repeater 1202.

At 1208, the repeater 1202 may initially process the SSBs received from the gNB 1204 as a UE would for a typical access procedure, and then send a random access channel (RACH) preamble (Msg1) to the gNB 1204.

At 1210, the gNB 1204 may transmit a random access response (RAR/Msg2) to the repeater 1202, and the repeater 1202 may receive the RAR/Msg2. Although, in some cases, there may be certain restrictions in place to help simplify the repeater 1202 complexity and initialization. For example, there may be no non-access stratum (NAS) messaging nor core network state signaling. Further, the RRC may be carried on a designated signaling radio bearer (e.g., SRB0) with no ciphering or integrity protection. Further, there may be no mobility management and connect mode discontinuous reception (C-DRX) may be explicitly enabled/disabled for power management.

After sending the RAR/Msg2, the gNB 1204 may still not know whether the repeater 1202 is a smart repeater (or a repeater at all). Therefore, at 1212, the repeater 1202 may indicate it is the repeater (or is capable of acting as the repeater), for example, in an RRC connection request (Msg3) via a field (labeled "Repeater indication").

At 1214, upon receiving the repeater indication, the gNB 1204 may include, in an RRC connection response, a request for information from the repeater 1202 (e.g., via a "capability inquiry related to a repeater" field). The request for the information from the repeater 1202 may ask about beam support of the repeater 1202, such as how many beams the repeater 1202 supports, how those beams might be addressed by the gNB 1204 via the control interface, and the like.

At 1216, the repeater 1202 may provide the requested information associated with the beam support via an RRC capability response message that includes a "codebook map" field. As will be described in greater detail below, the codebook map may communicate the information regarding the various beams supported by the repeater 1202 and, in some cases, quasi co-location relationship for different sets of the beams.

At 1218, the gNB 1204 may send an RRC configuration (RRCConfig) message to the repeater 1202, which may include conventional information, such as tracking reference signal (TRS) information, bandwidth part (BWP) information, and control resource set (CORESET) information. The RRCConfig message may also indicate (via a field labeled "SSBALLOC") a set of SSBs that are allocated (belong) to the smart repeater 1202. These SSBs, for example, may be the SSBs the repeater 1202 has to monitor for, receive, and relay using various beam configurations. The parameters mentioned herein are examples only and different parameters may be exchanged in addition, or as an alternative to, these parameters.

Figure 13:
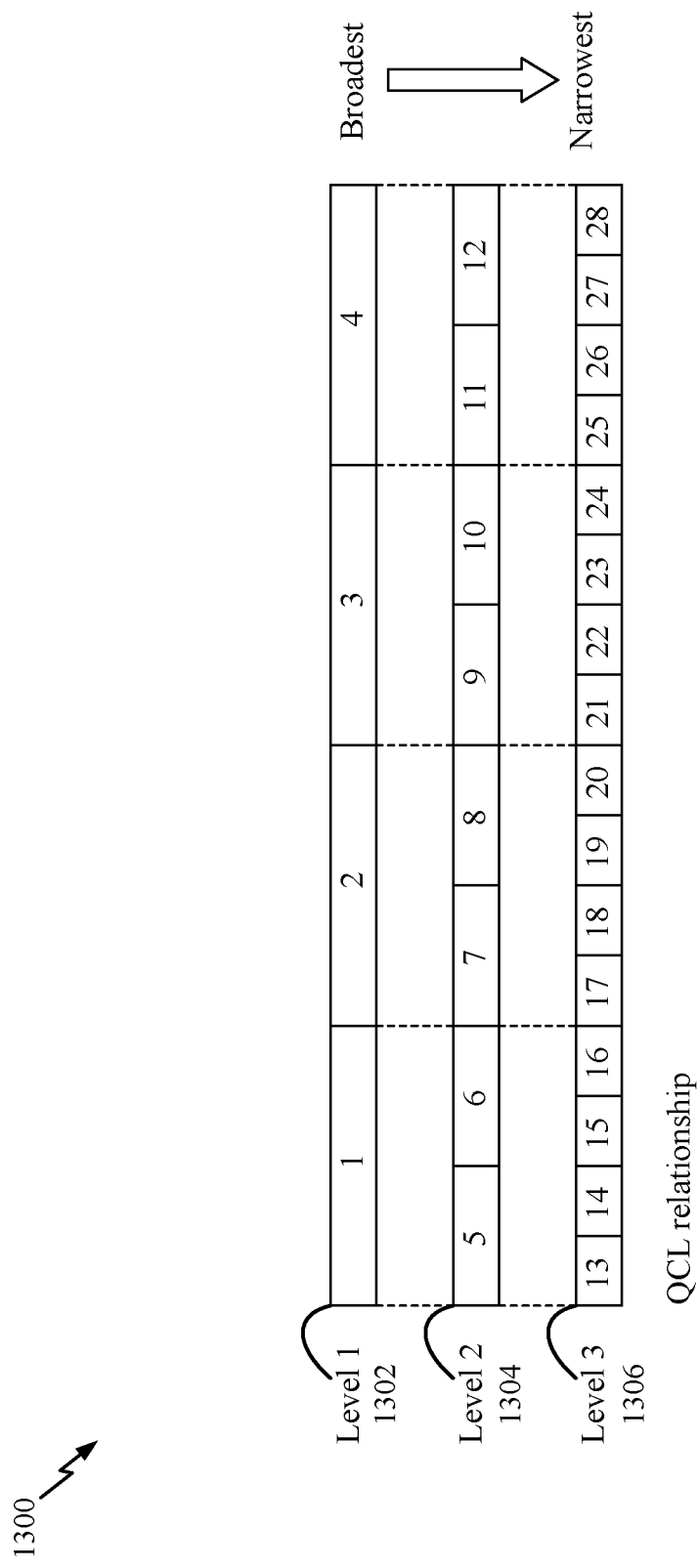
FIG. 13 illustrates an example codebook map, in accordance with certain aspects of the present disclosure.

FIG. 13 illustrates an example beam structure that may be conveyed by a repeater via a codebook map 1300. FIG. 13 is explained in conjunction with FIG. 12. As noted above with reference to FIG. 12, the codebook map 1300 is communicated by a repeater (e.g., the smart repeater 1202 of FIG. 12) to a gNB (e.g., the gNB 1204 of FIG. 12) as part of capability exchange.

As illustrated, in some cases, the codebook map 1300 may indicate a hierarchical structure. The gNB may use information conveyed by the codebook map 1300, for example, as follows. After the gNB determines that the repeater belongs to a broader beam at a first level 1302, it may use QCL relationship information to configure the repeater to communicate via corresponding narrower beams at a next level. Similarly, the gNB may optimize a direction even further by configuring the repeater to use even narrower beams at a next level.

The QCL relationship information may indicate a relationship of beams at different levels (for example, the first level 1302, a second level 1304, and a third level 1306). For example, the QCL relationship information may indicate that (intermediate width) beams 5 and 6 are under broad beam 1, narrow beams 13 and 14 are under beam 5, etc. In this example, if the gNB gets the information back about a quality of the beam 1, the gNB can request measurement the information for the beams 5 and 6 (and similarly for beams 13-16), and use that information for finding a narrowest beam with a best SNR.

While the example in FIG. 13 shows a hierarchy with 3 layers/levels, depending on a particular implementation, a hierarchy could have fewer layers (2) or more layers than this example.

In some cases, the codebook map selection (e.g., exactly which sets of the beams are included at each level) associated with the repeater may be done based on a location and an orientation of a placement of the repeater. For example, if the repeater is deployed on a corner wall, the repeater may only need to cover 90 degrees, so the codebook map associated with the repeater may not include a very wide set of broad beams (at a highest level). The codebook map associated with the repeater may be updated/customized, for example, if the repeater is relocated or re-oriented.

The number of beams per repeater need not be specified in the codebook map associated with the repeater, but a maximum value that a message can transport will be specified (e.g., in a similar manner as the L_max definition for SSB in NR that defines the number of SSBs in an SSB burst).

Example Embodiments

Embodiment 1: An apparatus for wireless communications by a first wireless device, comprising a memory; and a processor coupled with the memory, the memory and the processor configured to receive, from a base station (BS), broadcast information indicating that the BS supports wireless devices that are capable of acting as repeaters; perform an initial access procedure with the BS, based on the broadcast information, whereby the first wireless device provides an indication that the first wireless device is capable of acting as a repeater; and provide information to the BS regarding beams supported by the first wireless device.

Embodiment 2: The apparatus of Embodiment 1, wherein the information regarding the beams supported by the first wireless device is provided during the initial access procedure.

Embodiment 3: The apparatus of any of Embodiments 1-2, wherein the broadcast information is received via at least one of a directional transmission, remaining minimum system information (RMSI), or a system information block type 1 (SIB1) from the BS including a synchronization signal block (SSB).

Embodiment 4: The apparatus of Embodiment 3, wherein the memory and the processor are further configured to receive an indication of SSBs designated for the first wireless device.

Embodiment 5: The apparatus of any of Embodiments 1-4, wherein the first wireless device provides the indication that the first wireless device is capable of acting as a repeater in a radio resource control (RRC) connection request message.

Embodiment 6: The apparatus of any of Embodiments 1-5, wherein the memory and the processor are further configured to receive, from the BS, a response to the RRC connection request message that includes a capability request, wherein the information regarding the beams supported by the first wireless device is provided in a response to the capability request.

Embodiment 7: The apparatus of Embodiment 6, wherein the information regarding the beams supported by the first wireless device is provided via a codebook map that indicates beam identifiers (IDs) and quasi co-location (QCL) relationship information for the beam IDs.

Embodiment 8: The apparatus of Embodiment 7, wherein the QCL relationship information indicates a first set of one or more beams; and for each of the first set of one or more beams, a corresponding second set of beams, wherein each beam of the second set of beams is narrower than a corresponding first beam for the second set of beams.

Embodiment 9: The apparatus of Embodiment 8, wherein the QCL relationship information indicates for each of the second set of beams, at least a corresponding third set of beams, wherein each beam of the third set of beams is narrower than a corresponding second beam for the third set of beams.

Embodiment 10: The apparatus of any of Embodiments 1-7, wherein the memory and the processor are further configured to select content of the codebook map based on at least one of a location or an orientation of the first wireless device.

Embodiment 11: An apparatus for wireless communications by a base station (BS), comprising a memory; and a processor coupled with the memory, the memory and processor configured to transmit broadcast information indicating that the BS supports wireless devices that are capable of acting as repeaters; perform an initial access procedure with a first wireless device, whereby the first wireless device provides an indication that the first wireless device is capable of acting as a repeater; receive information from the first wireless device regarding beams supported by the first wireless device; and use the information regarding the beams to configure the first wireless device to exchange radio frequency (RF) signals between the BS and at least one second wireless device.

Embodiment 12: The apparatus of Embodiment 11, wherein the information regarding the beams supported by the first wireless device is received during the initial access procedure.

Embodiment 13: The apparatus of any of Embodiments 11-12, wherein the broadcast information is transmitted via at least one of a directional transmission, remaining minimum system information (RMSI), or a system information block type 1 (SIB1) from the BS including a synchronization signal block (SSB).

Embodiment 14: The apparatus of Embodiment 13, wherein the memory and the processor are further configured to provide an indication of SSBs designated for the first wireless device.

Embodiment 15: The apparatus of any of Embodiments 11-14, wherein the first wireless device provides the indication that the first wireless device is capable of acting as a repeater in a radio resource control (RRC) connection request message.

Embodiment 16: The apparatus of any of Embodiments 11-15, wherein the memory and the processor are further configured to transmit, to the first wireless device, a response to the RRC connection request message that comprises a capability request, wherein the information regarding the beams supported by the first wireless device is provided in a response to the capability request.

Embodiment 17: The apparatus of Embodiment 16, wherein the information regarding the beams supported by the first wireless device is provided via a codebook map that indicates beam identifiers (IDs) and quasi co-location (QCL) relationship information for the beam IDs.

Embodiment 18: The apparatus of Embodiment 17, wherein the QCL relationship information indicates a first set of one or more beams; and for each of the first set of one or more beams, a corresponding second set of beams, wherein each beam of the second set of beams is narrower than a corresponding first beam for the second set of beams.

Embodiment 19: The apparatus of Embodiment 18, wherein the QCL relationship information indicates for each of the second set of beams, at least a corresponding third set of beams, wherein each beam of the third set of beams is narrower than a corresponding second beam for the third set of beams.

Embodiment 20: A method for wireless communications by a first wireless device, comprising receiving, from a base station (BS), broadcast information indicating that the BS supports wireless devices that are capable of acting as repeaters; participating in an initial access procedure with the BS, based on the broadcast information, whereby the first wireless device provides an indication that the first wireless device is capable of acting as a repeater; and providing information to the BS regarding beams supported by the first wireless device.

Embodiment 21: The method of Embodiment 20, wherein the information regarding the beams supported by the first wireless device is provided during the initial access procedure.

Embodiment 22: The method of any of Embodiments 20-21, wherein the broadcast information is received via at least one of a directional transmission, remaining minimum system information (RMSI), or a system information block type 1 (SIB1) from the BS including a synchronization signal block (SSB).

Embodiment 23: The method of Embodiment 22, further comprising an indication of SSBs designated for the first wireless device.

Embodiment 24: The method of any of Embodiments 20-23, wherein the first wireless device provides the indication that the first wireless device is capable of acting as the repeater in a radio resource control (RRC) connection request message.

Embodiment 25: The method of any of Embodiments 20-24, further comprising receiving, from the BS, a response to the RRC connection request message that comprises a capability request, wherein the information regarding the beams supported by the first wireless device is provided in a response to the capability request.

Embodiment 26: A method for wireless communications by a base station (BS), comprising transmitting broadcast information indicating that the BS supports wireless devices that are capable of acting as repeaters; performing an initial access procedure with a first wireless device, whereby the first wireless device provides an indication that the first wireless device is capable of acting as a repeater; receiving information from the first wireless device regarding beams supported by the first wireless device; and using the information regarding the beams to configure the first wireless device to exchange radio frequency (RF) signals between the BS and at least one second wireless device.

Embodiment 27: The method of Embodiment 26, wherein the information regarding the beams supported by the first wireless device is received during the initial access procedure.

Embodiment 28: The method of any of Embodiments 26-27, wherein the broadcast information is transmitted via at least one of a directional transmission, remaining minimum system information (RMSI), or a system information block type 1 (SIB1) from the BS including a synchronization signal block (SSB).

Embodiment 29: The method of Embodiment 28, further comprising providing an indication of SSBs designated for the first wireless device.

Embodiment 30: The method any of Embodiments 26-29, wherein the first wireless device provides the indication that the first wireless device is capable of acting as a repeater in a radio resource control (RRC) connection request message.

Additional Considerations

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as combinations that include multiples of one or more members (aa, bb, and/or cc).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Means for receiving or means for obtaining may include a receiver (such as the receive processor 338) or an antenna(s) 334 of the AP 110 or the receive processor 358 or antenna(s) 352 of the UE 120 illustrated in FIG. 3. Means for transmitting or means for outputting may include a transmitter (such as the transmit processor 320) or an antenna(s) 334 of the AP 110 or the transmit processor 364 or antenna(s) 352 of the UE 120 illustrated in FIG. 3. Means for associating, means for determining, means for monitoring, means for deciding, means for providing, means for detecting, means for performing, and/or means for setting may include a processing system, which may include one or more processors, such as the receive processor 338/358, the transmit processor 320/364, the TX MIMO processor 330/366, or the controller 340/380 of the AP 110 and the UE 120 illustrated in FIG. 3.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or access point as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or access point can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications by a first wireless device, comprising:
   a memory; and
   a processor coupled with the memory, the memory and the processor configured to:
      receive from a base station (BS) broadcast information indicating that the BS supports wireless devices that are capable of acting as repeaters;
      perform an initial access procedure with the BS, based on the broadcast information, during which the first wireless device provides an indication that the first wireless device is capable of acting as a repeater; and
      provide information to the BS regarding beams supported by the first wireless device.

2. The apparatus of claim 1, wherein the information regarding the beams supported by the first wireless device is provided during the initial access procedure.

3. The apparatus of claim 1, wherein the broadcast information is received via at least one of a directional transmission, remaining minimum system information (RMSI), or a system information block type 1 (SIB1) from the BS including a synchronization signal block (SSB).

4. The apparatus of claim 3, wherein the memory and the processor are further configured to:
   receive an indication of SSBs designated for the first wireless device.

5. The apparatus of claim 1, wherein the first wireless device provides the indication that the first wireless device is capable of acting as a repeater in a radio resource control (RRC) connection request message.

6. The apparatus of claim 5, wherein the memory and the processor are further configured to:
   receive, from the BS, a response to the RRC connection request message that includes a capability request, wherein the information regarding the beams supported by the first wireless device is provided in a response to the capability request.

7. The apparatus of claim 6, wherein the information regarding the beams supported by the first wireless device is provided via a codebook map that indicates beam identifiers (IDs) and quasi co-location (QCL) relationship information for the beam IDs.

8. The apparatus of claim 7, wherein the QCL relationship information indicates:
   a first set of one or more beams; and
   for each of the first set of one or more beams, a corresponding second set of beams, wherein each beam of the second set of beams is narrower than a corresponding first beam for the second set of beams.

9. The apparatus of claim 8, wherein the QCL relationship information indicates:
   for each of the second set of beams, at least a corresponding third set of beams, wherein each beam of the third set of beams is narrower than a corresponding second beam for the third set of beams.

10. The apparatus of claim 7, wherein the memory and the processor are further configured to:
    select content of the codebook map based on at least one of a location or an orientation of the first wireless device.

11. An apparatus for wireless communications by a base station (BS), comprising:
    a memory; and
    a processor coupled with the memory, the memory and the processor configured to:
       transmit broadcast information indicating that the BS supports wireless devices that are capable of acting as repeaters;
       perform an initial access procedure with a first wireless device, during which the first wireless device provides an indication that the first wireless device is capable of acting as a repeater;

receive information from the first wireless device regarding beams supported by the first wireless device; and use the information regarding the beams to configure the first wireless device to exchange radio frequency (RF) signals between the BS and at least one second wireless device.

12. The apparatus of claim 11, wherein the information regarding the beams supported by the first wireless device is received during the initial access procedure.

13. The apparatus of claim 11, wherein the broadcast information is transmitted via at least one of a directional transmission, remaining minimum system information (RMSI), or a system information block type 1 (SIB1) from the BS including a synchronization signal block (SSB).

14. The apparatus of claim 13, wherein the memory and the processor are further configured to:

provide an indication of SSBs designated for the first wireless device.

15. The apparatus of claim 11, wherein the first wireless device provides the indication that the first wireless device is capable of acting as a repeater in a radio resource control (RRC) connection request message.

16. The apparatus of claim 15, wherein the memory and the processor are further configured to:

transmit, to the first wireless device, a response to the RRC connection request message that comprises a capability request, wherein the information regarding the beams supported by the first wireless device is provided in a response to the capability request.

17. The apparatus of claim 16, wherein the information regarding the beams supported by the first wireless device is provided via a codebook map that indicates beam identifiers (IDs) and quasi co-location (QCL) relationship information for the beam IDs.

18. The apparatus of claim 17, wherein the QCL relationship information indicates:

a first set of one or more beams; and for each of the first set of one or more beams, a corresponding second set of beams, wherein each beam of the second set of beams is narrower than a corresponding first beam for the second set of beams.

19. The apparatus of claim 18, wherein the QCL relationship information indicates:

for each of the second set of beams, at least a corresponding third set of beams, wherein each beam of the third set of beams is narrower than a corresponding second beam for the third set of beams.

20. A method for wireless communications by a first wireless device, comprising:

receiving, from a base station (BS), broadcast information indicating that the BS supports wireless devices that are capable of acting as repeaters;

participating in an initial access procedure with the BS, based on the broadcast information, during which the first wireless device provides an indication that the first wireless device is capable of acting as a repeater; and providing information to the BS regarding beams supported by the first wireless device.

21. The method of claim 20, wherein the information regarding the beams supported by the first wireless device is provided during the initial access procedure.

22. The method of claim 20, wherein the broadcast information is received via at least one of a directional transmission, remaining minimum system information (RMSI), or a system information block type 1 (SIB1) from the BS including a synchronization signal block (SSB).

23. The method of claim 22, further comprising:

receiving an indication of SSBs designated for the first wireless device.

24. The method of claim 20, wherein the first wireless device provides the indication that the first wireless device is capable of acting as the repeater in a radio resource control (RRC) connection request message.

25. The method of claim 24, further comprising:

receiving, from the BS, a response to the RRC connection request message that comprises a capability request, wherein the information regarding the beams supported by the first wireless device is provided in a response to the capability request.

26. A method for wireless communications by a base station (BS), comprising:

transmitting broadcast information indicating that the BS supports wireless devices that are capable of acting as repeaters;

performing an initial access procedure with a first wireless device, during which the first wireless device provides an indication that the first wireless device is capable of acting as a repeater;

receiving information from the first wireless device regarding beams supported by the first wireless device; and using the information regarding the beams to configure the first wireless device to exchange radio frequency (RF) signals between the BS and at least one second wireless device.

27. The method of claim 26, wherein the information regarding the beams supported by the first wireless device is received during the initial access procedure.

28. The method of claim 26, wherein the broadcast information is transmitted via at least one of a directional transmission, remaining minimum system information (RMSI), or a system information block type 1 (SIB1) from the BS including a synchronization signal block (SSB).

29. The method of claim 28, further comprising:

providing an indication of SSBs designated for the first wireless device.

30. The method of claim 26, wherein the first wireless device provides the indication that the first wireless device is capable of acting as a repeater in a radio resource control (RRC) connection request message.

* * * * *